(12) United States Patent
Ray et al.

(10) Patent No.: US 12,412,311 B2
(45) Date of Patent: Sep. 9, 2025

(54) HIGH LEVEL SYNTAX REFINEMENTS FOR GEOMETRY POINT CLOUD COMPRESSION (G-PCC)

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 17/469,704

(22) Filed: Sep. 8, 2021

(65) Prior Publication Data

US 2022/0114763 A1    Apr. 14, 2022

Related U.S. Application Data

(60) Provisional application No. 63/090,027, filed on Oct. 9, 2020.

(51) Int. Cl.
*G06T 9/00*     (2006.01)
*G01S 17/89*    (2020.01)
*G06T 3/40*     (2024.01)
*G06T 9/40*     (2006.01)

(52) U.S. Cl.
CPC .............. *G06T 9/001* (2013.01); *G01S 17/89* (2013.01); *G06T 3/40* (2013.01); *G06T 9/40* (2013.01)

(58) Field of Classification Search
None
See application file for complete search history.

(56) References Cited

U.S. PATENT DOCUMENTS

| 10,860,212 | B1 | 12/2020 | Chinthekindi et al. |
| 11,729,428 | B2 * | 8/2023 | Ramasubramonian ...................... H04N 19/597 375/240.01 |
| 2017/0345207 | A1 | 11/2017 | Seiler |
| 2019/0325089 | A1 * | 10/2019 | Golparvar-Fard .... G06T 19/003 |
| 2019/0384864 | A1 | 12/2019 | Ganti et al. |
| 2020/0302680 | A1 | 9/2020 | Yip et al. |
| 2021/0192798 | A1 * | 6/2021 | Lasserre .............. H04N 19/184 |
| 2021/0209812 | A1 | 7/2021 | Han et al. |

(Continued)

FOREIGN PATENT DOCUMENTS

| TW | 202037174 A | 10/2020 | |
| WO | WO2021084295 | * 10/2019 | |
| WO | WO-2021084295 A1 | * 5/2021 | ............... G06T 9/40 |

OTHER PUBLICATIONS

WO2021/084295 Lasserre, Sebastien et al (Year: 2019).*

(Continued)

*Primary Examiner* — Nancy Bitar
(74) *Attorney, Agent, or Firm* — QUALCOMM Incorporated; Espartaco Diaz Hidalgo

(57) ABSTRACT

A method of encoding point cloud data includes determining an amount by which a laser turns for determining points in a point cloud represented by the point cloud data, generating a syntax element indicative of the amount by which the laser turns, wherein a value of the syntax element is a defined value less than the amount by which the laser turns, and signaling the syntax element.

34 Claims, 5 Drawing Sheets

(56) References Cited

U.S. PATENT DOCUMENTS

| | | | |
|---|---|---|---|
| 2021/0218994 | A1 | 7/2021 | Flynn |
| 2021/0289211 | A1 | 9/2021 | Oh et al. |
| 2021/0295567 | A1 | 9/2021 | Lee et al. |
| 2021/0312670 | A1* | 10/2021 | Mammou .............. H04N 19/96 |
| 2021/0326734 | A1 | 10/2021 | Van Der Auwera et al. |
| 2021/0329052 | A1 | 10/2021 | Oh |
| 2021/0329055 | A1 | 10/2021 | Hur et al. |
| 2021/0377566 | A1 | 12/2021 | Iguchi et al. |
| 2021/0400103 | A1* | 12/2021 | Hur ........................ H04L 65/75 |
| 2021/0400280 | A1 | 12/2021 | Zaghetto et al. |
| 2021/0400292 | A1 | 12/2021 | Choi et al. |
| 2021/0400308 | A1 | 12/2021 | Ray |
| 2021/0407142 | A1 | 12/2021 | Hur et al. |
| 2022/0256190 | A1 | 8/2022 | Hur et al. |
| 2022/0398784 | A1* | 12/2022 | Taquet ...................... G06T 9/40 |
| 2024/0185475 | A1* | 6/2024 | Gao ........................ H04N 19/70 |

OTHER PUBLICATIONS

International Search Report and Written Opinion—PCT/US2021/049668—ISA/EPO—Dec. 7, 2021, 15 pages.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
Ray B., et al.,"[G-PCC] [new] Misc. High Level Syntax Refinements for G-PCC", International Organisation for Standardisation Organisation Internationale DE Normalisation ISO/IEC JTC 1/SC 29/WG 7 Coding of Moving Pictures and Audio, ISO/IEC JTC 1/SC 29/WG 7 m 55378, Oct. 2020, 15 Pages.
"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020, XP030287968 (126 pp).
WG 7, MPEG 3D Graphics Coding: "G-PCC Codec Description v11", International Organization for Standardization Organisation Internationale DE Normalisation ISO/IEC JTC 1/SC 29/WG 7 MPEG 3D Graphics Coding, ISO/IEC JTC 1/SC 29/WG 7 N0099, Apr. 2021, 153 Pages.
3DG: "CE4FE 13.29 Geometry Quantization QP Control", 129. MPEG Meeting, Jan. 13, 2020-Jan. 17, 2020, Brussels, (Motion Picture Expert Group or ISO/IEC JTC1/SC29/WG11), No. N19113, Mar. 25, 2020 (Mar. 25, 2020), 5 Pages, XP030285359, Retrieved from the Internet: URL: http://phenix.int-evry.fr/mpeg/doc_end_user/documents/129_Brussels/wg11/w19113.zip, w19113_CE13_29_Geometry_Quantization_QP_control.docx [retrieved on Mar. 25, 2020].
3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.
3DG: "G-PCC Future Enhancements", International Organisation for Standardisation Organisation Internationale De Normalisation, ISO/IEC JTC 1/SC 29/WG 11 Coding of Moving Pictures and Audio, ISO/IEC JTC 1/SC 29/WG 11, N18887, Geneva, CH—Oct. 2019, 128. MPEG Meeting, Oct. 7, 2019-Oct. 11, 2019, Geneva, (Motion Picture Expert Group or ISO/IEC JTC1/SC29/WG11), No. n18887, Dec. 23, 2019, XP030225587, 277 Pages.
3DG: "G-PCC Test Model v9", 129. MPEG Meeting, Jan. 13, 2020-Jan. 17, 2020, Brussels, (Motion Picture Expert Group or ISO/IEC JTC1/SC29/WG11), No. N19083, Apr. 9, 2020 (Apr. 9, 2020), 15 Pages, XP030287963, Retrieved from the Internet: URL: http://phenix.int-evry.fr/mpeg/doc_end_user/documents/129_Brussels/wg11/w19083.zip w19083.pdf, [retrieved on Apr. 9, 2020].

"G-PCC Future Enhancements", 130. MPEG Meeting, Apr. 20, 2020-Apr. 24, 2020, Alpbach, (Motion Picture Expert Group or ISO/IEC JTC1/SC29/WG11), No. n19328, Jul. 21, 2020, XP030289574, 140 Pages.
ITTF via SC 29 Secretariat: "Summary of Voting on ISO/IEC DIS 23090-9", 132. MPEG Meeting, Oct. 12, 2020-Oct. 16, 2020, Online, (Motion Picture Expert Group or ISO/IEC JTC1/SC29/WG11), No. m54899 Sep. 18, 2020 (Sep. 18, 2020), XP030292349, Retrieved from the Internet: URL: https://dms.mpeg.expert/doc_end_user/documents/132_OnLine/wg11/m54899-v1-m54899.zip CommentFiles/ISO_IEC DIS 23090-9 Collated Comments.doc [retrieved on Sep. 18, 2020].
Lasserre (Blackberry), S., et al., "M52958 [GPCC] [CE 13. 22] Report on Azimuthal Coding Mode", 130. MPEG Meeting, Apr. 20, 2020-Apr. 24, 2020, Alpbach, (Motion Picture Expert Group or ISO/IEC JTC1/SC29/WG11), No. m52958 Mar. 18, 2020, XP030285279, 3 Pages.
Lasserre S., (Blackberry) et al., "[GPCC] [CE 13.22 ] Report on Angular Coding Mode", 129. MPEG Meeting, Jan. 13, 2020-Jan. 17, 2020, Brussels, (Motion Picture Expert Group or ISO/IEC JTC1/SC29/WG11). No. M51594, Jan. 8, 2020, XP030224657, 4 Pages.
Oh, H-M., (LGE), et al., "[G-PCC] EE13.43 Report on Coordinate Conversion", 132. MPEG Meeting, Oct. 12, 2020-Oct. 16, 2020, Online, (Motion Picture Expert Group or ISO/IEC JTC1/SC29/WG7), No. m55349, Oct. 7, 2020 (Oct. 7, 2020), XP030292862, pp. 1-4, Retrieved from the Internet: URL: https://dms.mpeg.expert/doc_end_user/documents/132_OnLine/wg7/m55349-v1-m55349.zip m55349 EE13.43 report on coordinate conversion.docx [retrieved on Oct. 7, 2020].
Ramasubramonian A.K., (Qualcomm) et al., "[G-PCC] Normative Bounding Box and Global Scaling for Point Clouds". 131. MPEG Meeting, Jun. 29, 2020-Jul. 3, 2020, Online, (Motion Picture Expert Group or ISO/IEC JTC1/SC29/WG11) No. m54584, Jun. 20, 2020, XP030289056, 16 Pages.
Ray, B., (Qualcomm), et al., "[G-PCC] [new] Angular HLS Improvement and Bugfix", 131. MPEG Meeting, Jun. 29, 2020-Jul. 3, 2020, Online, (Motion Picture Expert Group or ISO/IEC JTC1/SC29/WG11), No. m54702, Jun. 23, 2020 (Jun. 23, 2020), XP030289275, 8 Pages.
Ray, B., (Qualcomm) et al., "[G-PCC] [New] Various HLS Fixes and Improvements", 132. MPEG Meeting, Oct. 12, 2020-Oct. 16, 2020, Online, (Motion Picture Expert Group or ISO/IEC JTC1/SC29/WG11), No. m55378 Oct. 10, 2020 (Oct. 10, 2020), XP030291890, Retrieved from the Internet: URL: https://dms.mpeg.expert/doc_end_user/documents/132_OnLine/wg11/m55378-v1-m55378-v1.zip m55378-v1/m55378-v1.docx [retrieved on Oct. 10, 2020], 11 pages.
"Report of the 129th Meeting", 130. MPEG Meeting, Apr. 20, 2020-Apr. 24, 2020, Alpbach, (Motion Picture Expert Group or ISO/IEC JTC1/SC29/WG11), No. n19173, May 24, 2020 (May 24, 2020), XP030285445, Retrieved from the Internet: URL: http://phenix.int-evry.fr/mpeg/doc_end_user/documents/130_Alpbach/wg11/w19173.zip w19173 - report.docx, [retrieved on May 24, 2020], 289 pages.
1 Taiwan Search Report—TW110133568—TIPO—Sep. 9, 2024 (1 pp).
ITTI VIA SC 29 Secretariat: "Summary of Voting on ISO/IEC DIS 23090-9", Information Technology—MPEG-I (Coded Representation of Immersive Media)—Part 9: Geometry-based Point Cloud Compression, Motion Picture Expert Group or ISO/IEC JTC1/SC29/WG11, 141 Pages, Sep. 18, 2020.

* cited by examiner

HIGH LEVEL SYNTAX REFINEMENTS FOR GEOMETRY POINT CLOUD COMPRESSION (G-PCC)

This application claims the benefit of U.S. Provisional Application No. 63/090,027, filed Oct. 9, 2020, the entire contents of which are hereby incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for refinements and/or improvements in high level syntax for geometry point cloud compression (G-PCC). For example, this disclosure describes example syntax elements for G-PCC and configuring decoding of a point cloud based on the example syntax elements. In one or more examples, the number of syntax elements utilized may be reduced, as compared to some other techniques, which in turn reduces bandwidth utilization. For instance, the example techniques may relate to removal of redundancies and refinement of high level syntax of G-PCC.

A G-PCC encoder may determine an amount by which a laser turns for determining points in a point cloud. There may be a requirement that the amount by which a laser turns for determining points in a point cloud be a non-zero number. That is, there may be a requirement that each laser rotate to determine points in the point cloud. Accordingly, rather than the G-PCC encoder signaling a value indicative of the actual amount by which the laser turns, the G-PCC encoder may signal in a value that is equal to the actual amount by which the laser turns minus a defined value (e.g., 1). The G-PCC decoder may add the defined value to the received value to determine the amount by which the laser turns. For example, if the G-PCC encoder signals a value of 0 for the amount by which the laser turns, then the G-PCC decoder may determine the actual amount by which the laser turns is 1 (e.g., 0+1).

G-PCC encoder signaling a smaller value tends to require less bandwidth than G-PCC encoder signaling a larger value. Therefore, by G-PCC encoder signaling a value that is equal to the actual amount by which the laser turns minus a defined value (e.g., 1) rather than a value equal to the actual amount by which the laser turns, the example techniques may reduce the amount of data that needs to be signaled, and promote bandwidth efficiencies.

In one example, a method of encoding point cloud data includes determining an amount by which a laser turns for determining points in a point cloud represented by the point cloud data, generating a syntax element indicative of the amount by which the laser turns, wherein a value of the syntax element is a defined value less than the amount by which the laser turns, and signaling the syntax element.

In one example, a method of decoding point cloud data includes receiving a syntax element indicative of an amount by which a laser turns for determining points in a point cloud represented by the point cloud data, wherein a value of the syntax element is a defined value less than the amount by which the laser turns, determining the amount by which the laser turns based on the syntax element, and reconstructing the point cloud based on the determined amount by which the laser turns.

In one example, a device for encoding point cloud data includes memory configured to store the point cloud data and one or more processors coupled to the memory, wherein the one or more processors are configured to determine an amount by which a laser turns for determining points in a point cloud represented by the point cloud data, generate a syntax element indicative of the amount by which the laser turns, wherein a value of the syntax element is a defined value less than the amount by which the laser turns, and signal the syntax element.

In one example, a device for decoding point cloud data includes memory configured to store the point cloud data and one or more processors coupled to the memory, wherein the one or more processors are configured to receive a syntax element indicative of an amount by which a laser turns for determining points in a point cloud represented by the point cloud data, wherein a value of the syntax element is a defined value less than the amount by which the laser turns, determine the amount by which the laser turns based on the syntax element, and reconstruct the point cloud based on the determined amount by which the laser turns.

In one example, a device for encoding point cloud data includes means for determining an amount by which a laser turns for determining points in a point cloud represented by the point cloud data, means for generating a syntax element indicative of the amount by which the laser turns, wherein a value of the syntax element is a defined value less than the amount by which the laser turns, and means for signaling the syntax element.

In one example, a computer-readable storage medium storing instructions thereon that when executed cause one or more processors to determine an amount by which a laser turns for determining points in a point cloud represented by the point cloud data, generate a syntax element indicative of the amount by which the laser turns, wherein a value of the syntax element is a defined value less than the amount by which the laser turns, and signal the syntax element.

In one example, a device for decoding point cloud data includes means for receiving a syntax element indicative of the amount by which a laser turns for determining points in a point cloud represented by the point cloud data, wherein a value of the syntax element is a defined value less than the amount by which the laser turns, means for determining the amount by which the laser turns based on the syntax element, and means for reconstructing the point cloud based on the determined amount by which the laser turns.

In one example, a computer-readable storage medium storing instructions thereon that when executed cause one or more processors to receive a syntax element indicative of the amount by which a laser turns for determining points in a point cloud represented by the point cloud data, wherein a value of the syntax element is a defined value less than the amount by which the laser turns, determine the amount by which the laser turns based on the syntax element, and reconstruct the point cloud based on the determined amount by which the laser turns.

The details of one or more examples are set forth in the accompanying drawings and the description below. Other features, objects, and advantages will be apparent from the description, drawings, and claims.

DETAILED DESCRIPTION

Figure 1:
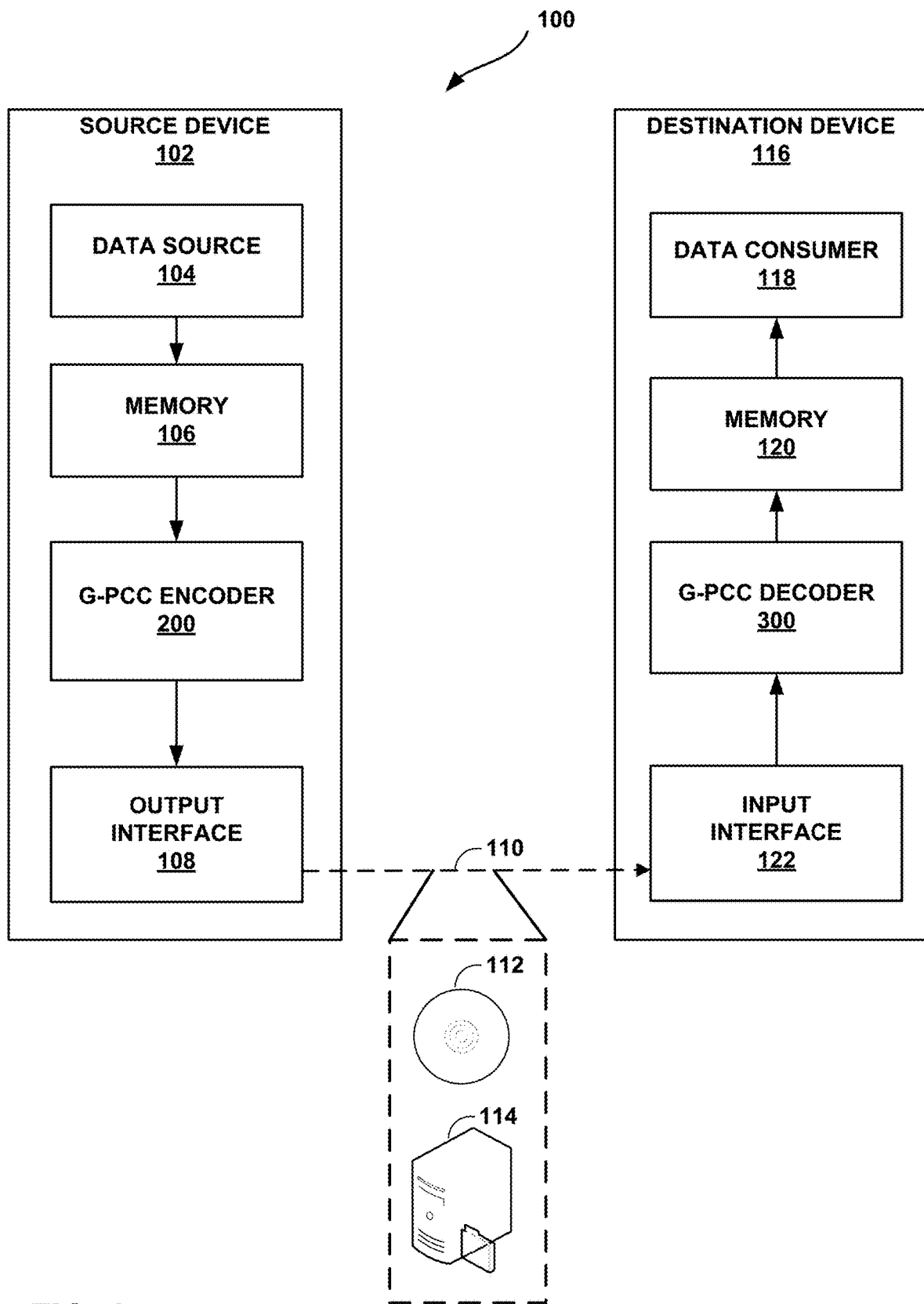
FIG. 1 is a block diagram illustrating an example encoding and decoding system that may perform the techniques of this disclosure.

In geometry point cloud compression (G-PCC), laser beams from a laser are used to determine points in the point cloud. For instance, sensors sense the reflection of the laser beams to determine where points reside in the point cloud. In some examples, a G-PCC encoder may encode the point cloud in an octree structure. For instance, the G-PCC encoder may partition the point cloud into a plurality of N×N×N cubes. For each cube that includes at least one point, the G-PCC encoder may further partition that cube into a plurality of N/2×N/2×N/2 cubes, further partition any of these cubes having at least one point, and so forth. The G-PCC encoder may encode the attribute values for the points in each of the cubes. The attribute values may be coordinate, color, and other such values.

As another example, the G-PCC encoder may encode the point cloud in a predictive tree structure. In the predictive tree structure, each point in the point cloud may be associated with a node in the predictive tree. The nodes may be connected together in a hierarchical structure, such that a node may have one or more ancestor nodes. In the predictive tree structure, the position (geometry) for a current node may be predicted from the position of one or more ancestor nodes, where the one or more ancestor nodes are encoded and decoded before the current node.

When the point cloud is encoded and decoded using the octree structure, the G-PCC encoder and the G-PCC decoder may be considered as performing octree coding (i.e., the geometry tree type is octree coding). When the point cloud is encoded and decoded using the predictive tree structure, the G-PCC encoder and the G-PCC decoder may be considered as performing predictive geometry coding (i.e., geometry tree type is predictive geometry coding). Predictive geometry coding may also be referred to as predictive tree coding. The syntax element geom_tree_type may indicate whether octree coding or predictive geometry coding is used. For instance, geom_tree_type=0 may mean that octree coding is used, and geom_tree_type=1 may mean that predictive geometry coding is used.

For both the octree coding and the predictive geometry coding, the G-PCC encoder may determine an amount by which a laser turns for determining points in the point cloud. As one example, the amount by which the laser turns may refer to a number of laser probes by the laser in one single rotation of the laser. The number of laser probes may be for the geometry tree type being octree coding (i.e., geom_tree_type=0). For instance, the number of laser probes by the laser in one single rotation of the laser may refer to the number of samples produced by the laser of a rotating sensing system located at the origin. The syntax element laser_phi_per_turn[i] may indicate the number of laser probes by the laser in one single rotation of the laser. However, as described in more detail, in one or more examples, rather than signaling laser_phi_per_turn[i], the G-PCC encoder may signal, and the G-PCC decoder may receive, laser_phi_per_turn_minus1[i].

As another example, the amount by which the laser turns may refer to a unit change in azimuth angle by which the laser turns. The unit change in azimuth angle may be for the geometry tree type being predictive geometry coding (i.e., geom_tree_type=1). The syntax element geom_angular_azimuth_step may indicate the unit change in azimuth angle. However, as described in more detail, in one or more examples, rather than signaling geom_angular_azimuth_step, the G-PCC encoder may signal and the G-PCC decoder may receive geom_angular_azimuth_step_minus1.

In the above examples, determining an amount by which a laser turns for determining points in the point cloud may include determining a number of laser probes by the laser in one single rotation of the laser and/or determining a unit change in azimuth angle by which the laser turns. For instance, a number of laser probes by the laser may indicate the amount by which a laser turns because the laser would turn for each of the probes. As an example, if the number of laser probes is four, then the laser would turn by 90-degrees. If the number of laser probes is two, then the laser would turn by 180-degrees.

In this disclosure, determining an amount by which the laser turns for determining points in the point cloud may be an inferential determination or an actual determination. That is, in the example of determining the number laser probes, the G-PCC encoder or the G-PCC decoder need not necessarily determine the amount by which the laser turns, but the amount by which the laser turns may be indicated by the number of laser probes. However, in this example, the G-PCC encoder or the G-PCC decoder may be considered as determining an amount by which the laser turns.

There may be a requirement that the amount by which the laser turns for determining points in the point cloud cannot be zero. In an example, laser_phi_per_turn[i] and geom_angular_azimuth_step cannot be zero, and have a minimum value of one. Therefore, in this example, rather than signaling the actual value of laser_phi_per_turn[i], it may be possible for the G-PCC encoder to signal and for the G-PCC decoder to receive a value that is the actual value of laser_phi_per_turn[i] minus a defined value (e.g., 1). In other words, rather than signaling and receiving laser_phi_per_turn[i], the G-PCC encoder may signal and the G-PCC decoder may receive laser_phi_per_turn_minus1[i], where 1 is the defined value. Similarly, rather than signaling the actual value of geom_angular_azimuth_step, it may be possible for the G-PCC encoder to signal and for the G-PCC decoder to receive a value that is the actual value of geom_angular_azimuth_step minus a defined value (e.g., 1). In other words, rather than signaling and receiving geom_angular_azimuth_step, the G-PCC encoder may signal and the G-PCC decoder may receive geom_angular_azimuth_step_minus1, where 1 is the defined value.

There may be a reduction in bandwidth by the G-PCC encoder signaling smaller values as compared to larger values. Therefore, there may be gains in bandwidth efficiency if the G-PCC encoder signals laser_phi_per_turn_minus1[i] instead of laser_phi_per_turn[i] for when geom_tree_type=0 (i.e., octree coding). Similarly, there may be gains in bandwidth efficiency if the G-PCC encoder signals geom_angular_azimuth_step_minus1 instead of geom_angular_azimuth_step for when geom_tree_type=1 (i.e., predictive tree coding).

From the perspective of the G-PCC decoder, the G-PCC decoder may receive laser_phi_per_turn_minus1[i], and add 1 to the received value to determine the actual value of laser_phi_per_turn (i.e., the actual value of the number of laser probes by the laser in one single rotation). Similarly, the G-PCC decoder may receive geom_angular_azimuth_step_minus1, and add 1 to the received value to determine the actual value of geom_angular_azimuth_step (i.e., the actual value of the unit change in azimuth angle by which the laser turns).

Accordingly, in one or more examples, the G-PCC encoder may determine an amount by which a laser turns for determining points in a point cloud represented by the point cloud data, generate a syntax element indicative of the amount by which the laser turns, wherein a value of the syntax element is a defined value less than the amount by which the laser turns, and signal the syntax element. The G-PCC decoder may receive a syntax element indicative of an amount by which a laser turns for determining points in a point cloud represented by the point cloud data, wherein a value of the syntax element is a defined value less than the amount by which the laser turns, determine the amount by which the laser turns based on the syntax element, and reconstruct the point cloud based on the determined amount by which the laser turns.

For instance, the amount by which the laser turns may be a number of laser probes by the laser in one single rotation (e.g., for the geometry tree type being octree coding). As another example, the amount by which the laser turns may be a unit change in azimuth angle by which the laser turns (e.g., for the geometry tree type being predictive geometry coding).

One example of the syntax element indicative of the amount by which the laser turns is laser_phi_per_turn_minus1[i], where a value of laser_phi_per_turn_minus1[i] is a defined value less than the amount by which the laser turns (e.g., one less than the number of probes by the laser in one single rotation). Another example of the syntax element indicative of the amount by which the laser turns is geom_angular_azimuth_step_minus1, where a value of geom_angular_azimuth_step_minus1 is a defined value less than the amount by which the laser turns (e.g., one less than the unit change in azimuth angle by which the laser turns).

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to refinements and/or improvements in high level syntax for G-PCC. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to refinements and/or improvements in high level syntax for G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19617, Teleconference, July 2021, and a description of the codec is available in G-PCC Codec Description v11, ISO/IEC JTC1/SC29/WG7 N0099, Teleconference, July 2021.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

One example way in which to determine points in the point cloud represented by the point cloud data is with a laser rotating and output laser beams. A sensor senses the reflection from the laser and based on the reflection determines a point and attribute data for the point. G-PCC encoder 200 may determine an amount by which a laser turns for determining points in a point cloud, and may signal information indicating the amount by which a laser turns. G-PCC decoder 300 may receive the information indicating the amount by which the laser turns, and reconstruct the point cloud based on the amount by which the laser turns.

As described above, there may be two tree structures for encoding and decoding the point cloud: octree structure and predictive tree structure. A geometry tree type (e.g., geom_tree_type syntax element) may indicate whether octree structure or predictive tree structure is used (e.g., geom_tree_type=0 means octree structure, and geom_tree_type=1 means predictive tree structure). If octree structure is used, then the point cloud may be for a geometry tree type being octree coding. If predictive tree structure is used, then the point cloud may be for a geometry tree type being predictive tree coding.

For both octree coding and predictive tree coding, G-PCC encoder 200 may determine an amount by which a laser turns for determining points in a point cloud represented by the point cloud data. For instance, for octree coding, to determine the amount by which the laser turns, G-PCC encoder 200 may determine a number of laser probes by the laser in one single rotation. That is, G-PCC encoder 200 may determine a number of samples produced by the laser in one single rotation (e.g., number of samples produced by the laser of a rotating system located at the origin). A sample may be equivalent to a probe. The number of samples may be the points in the point cloud. For predictive tree coding, to determine the amount by which the laser turns, G-PCC encoder 200 may determine a unit change in azimuth angle by which the laser turns. For instance, G-PCC encoder 200 may determine an amount of azimuth angle by which the laser steps for producing the samples. As stated above, the number of samples may be the points in the point cloud.

In one or more examples, G-PCC encoder 200 may generate a syntax element indicative of the amount by which the laser turns. However, rather than the value of the syntax element being equal to the actual amount by which the laser turns, the value of the syntax element may be a defined value less than the amount by which the laser turns. That is, to generate the syntax element, G-PCC encoder 200 may subtract the defined value from the amount by which the laser turns to generate the value of the syntax element. As one example, the defined value is equal to 1.

For instance, assume that laser_phi_per_turn indicates the number of laser probes for octree coding, and geom_angular_azimuth_step indicates the unit change in azimuth angle by which the laser turns for predictive tree coding. In one or more examples, G-PCC encoder 200 may determine laser_phi_per_turn_minus1 (e.g., laser_phi_per_turn minus 1) for octree coding, and determine geom_angular_azimuth_step_minus1 (e.g., geom_angular_azimuth_step minus 1). G-PCC encoder 200 may then signal the syntax element (e.g., laser_phi_per_turn_minus1 or geom_angular_azimuth_step_minus1).

G-PCC decoder 300 may receive a syntax element indicative of an amount by which a laser turns for determining points in a point cloud represented by the point cloud data. In this example, a value of the syntax element is a defined value less than the amount by which the laser turns. For instance, G-PCC decoder 300 may receive laser_phi_per_turn_minus1 or geom_angular_azimuth_step_minus1.

G-PCC decoder 300 may determine the amount by which the laser turns based on the syntax element. For instance, to determine the amount by which the laser turns based on the syntax element, G-PCC decoder 300 may add the defined value to the value of the syntax element. As an example, for octree coding, to determine a number of laser probes by the laser in one single rotation, G-PCC decoder 300 may add 1 to laser_phi_per_turn_minus1. As another example, for predictive tree coding, to determine a unit change in azimuth angle by which the laser turns, G-PCC decoder 300 may add 1 to geom_angular_azimuth_step_minus1.

G-PCC decoder 300 may reconstruct the point cloud based on the determined amount by which the laser turns. For example, G-PCC decoder 300 may reconstruct the point cloud based on the determined number of laser probes by the laser in one single rotation. As another example, G-PCC decoder 300 may reconstruct the point cloud based on the determined unit change in azimuth angle by which the laser turns.

Figure 2:
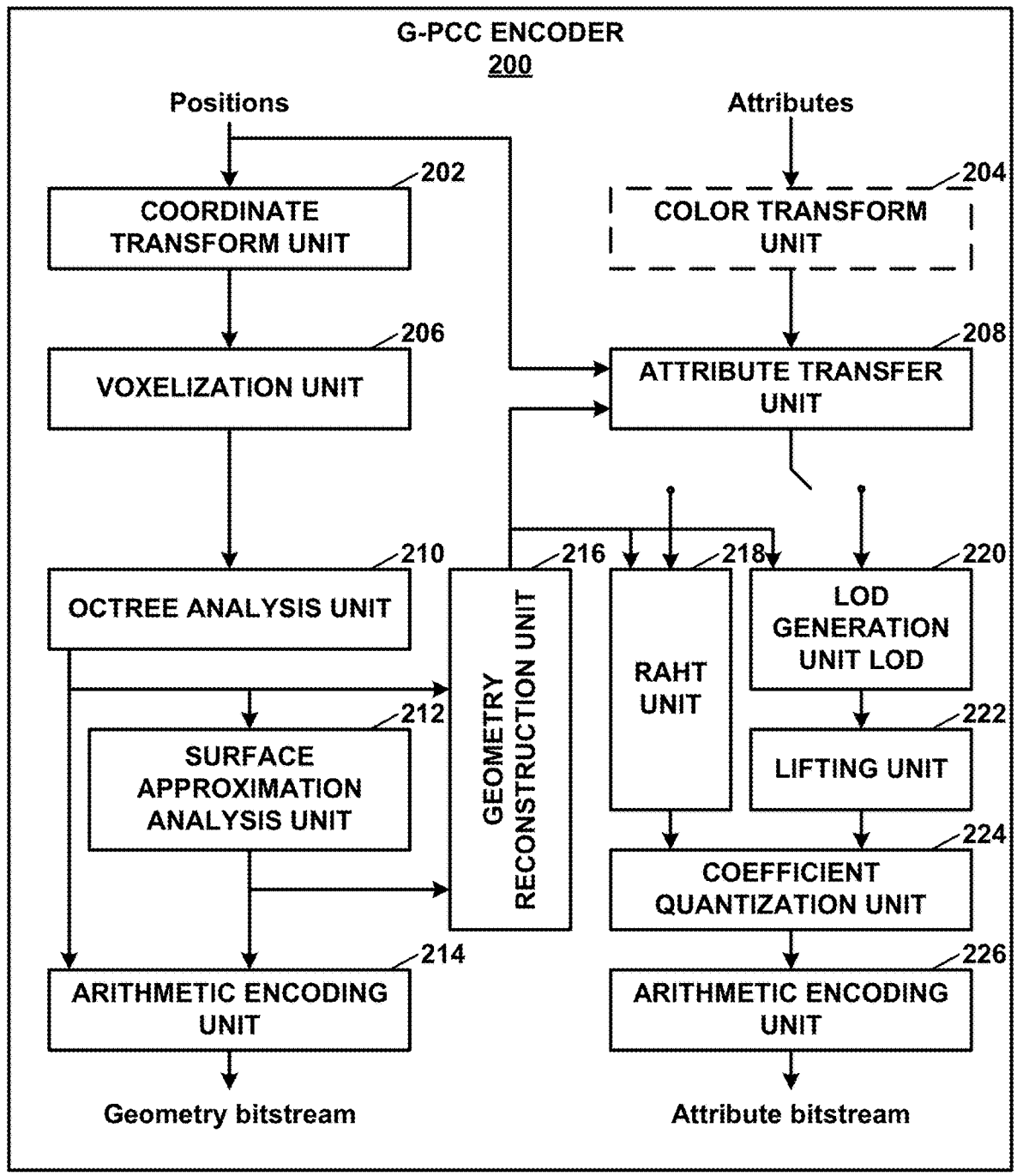
FIG. 2 is a block diagram illustrating an example Geometry Point Cloud Compression (G-PCC) encoder.
Figure 3:
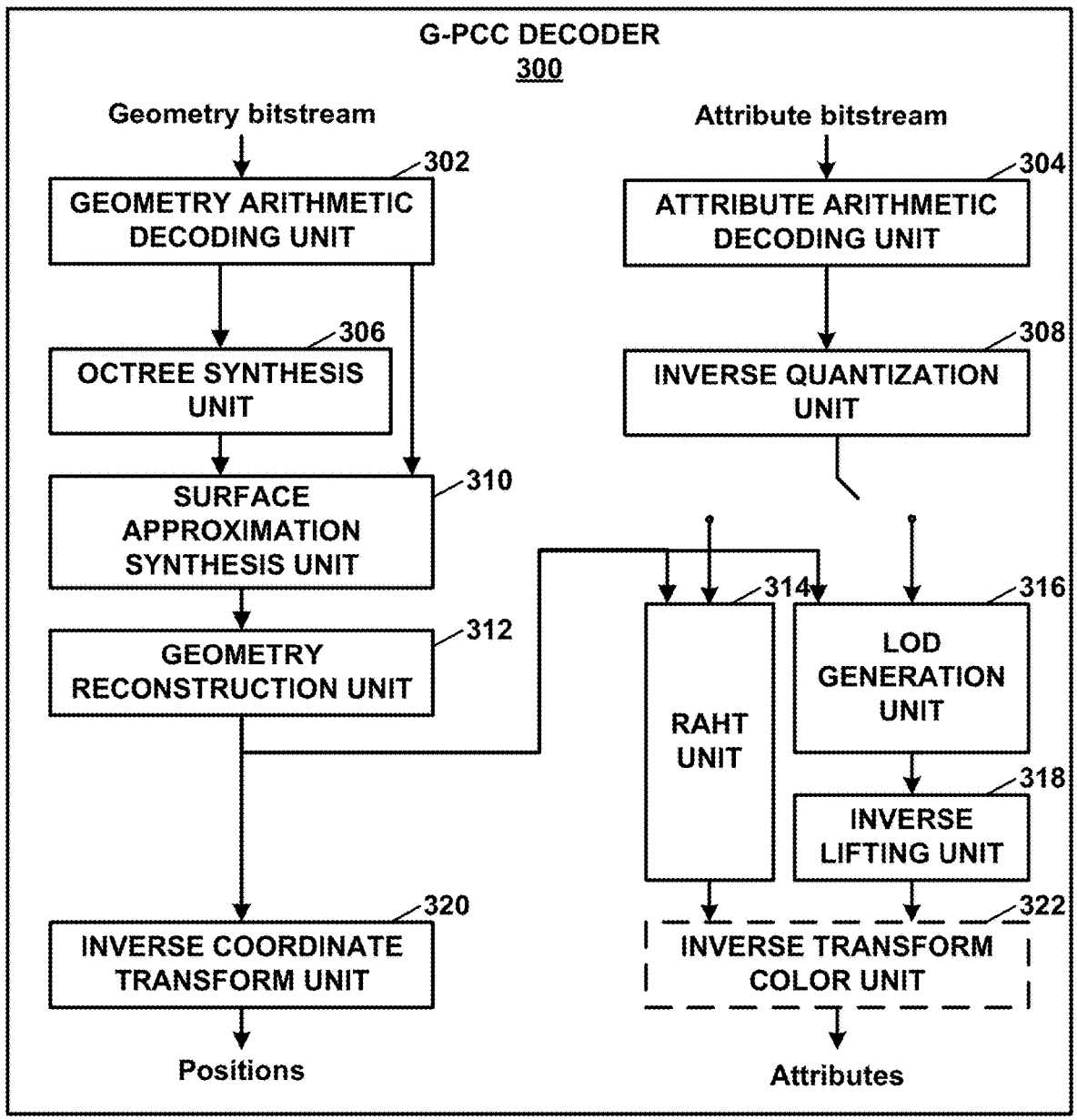
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, some modules (e.g., surface approximation analysis unit 212 and RAHT unit 218 of FIG. 2 and surface approximation synthesis unit 310 and RAHT unit 314 of FIG. 3) are options typically used for Category 1 data. Some modules (e.g., LOD generation unit LOD 220 and lifting unit 222 of FIG. 2 and LOD generation unit 316 and inverse lifting unit 318 of FIG. 3) are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit LOD 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit LOD 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In accordance with one or more examples described in this disclosure, G-PCC encoder 200 may determine an amount by which a laser turns for determining points in a point cloud represented by the point cloud data, generate a syntax element indicative of the amount by which the laser turns. A value of the syntax element may be a defined value less than the amount by which the laser turns. G-PCC encoder 200 may signal the syntax element. To generate the syntax element, G-PCC encoder 200 may subtract the defined value from the amount by which the laser turns to generate the value of the syntax element. The defined value may be equal to 1.

As one example, to determine the amount by which the laser turns, G-PCC encoder 200 may determine a number of laser probes (e.g., samples produced by the laser in one single rotation) by the laser in one single rotation (e.g., for a geometry tree type being octree coding). G-PCC encoder 200 may subtract one from the determined number of laser samples, and signal the resulting value as the syntax element (e.g., signal laser_phi_per_turn_minus1[i]). Determining the number of laser probes may be indicative of the amount by which the laser turns. It may not be necessary for G-PCC encoder 200 to determine the exact amount by which the laser turns, but determining the number of laser probes, from which it can be determined the amount by which the laser turns, may be considered as an example of G-PCC encoder 200 determining the amount by which the laser turns.

As another example, to determine the amount by which the laser turns, G-PCC encoder 200 may determine a unit change in azimuth angle by which the laser turns (e.g., for a geometry tree type being predictive tree coding). The unit change in azimuth angle may be an amount of azimuth angle by which the laser steps for producing samples. G-PCC encoder 200 may subtract one from the determined unit change in azimuth angle, and signal the resulting value as the syntax element (e.g., signal geom_angular_azimuth_step_minus1).

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

In accordance with one or more examples described in this disclosure, G-PCC decoder 300 may receive a syntax element indicative of an amount by which a laser turns for determining points in a point cloud represented by the point cloud data. A value of the syntax element may be a defined value less than the amount by which the laser turns. G-PCC decoder 300 may determine the amount by which the laser turns based on the syntax element, and reconstruct the point cloud based on the determined amount by which the laser turns. To determine the amount by which the laser turns based on the syntax element, G-PCC decoder 300 may add the defined value to the value of the syntax element. The defined value may be equal to 1.

As one example, to determine the amount by which the laser turns, G-PCC decoder 300 may determine a number of laser probes (e.g., samples produced by the laser in one single rotation) by the laser in one single rotation (e.g., for a geometry tree type being octree coding). G-PCC decoder 300 may add one to the value of the received syntax element (e.g., laser_phi_per_turn_minus1[i]) to determine the number of laser probes. As described above, determining the number of laser probes may be indicative of the amount by which the laser turns. It may not be necessary for G-PCC decoder 300 to determine the exact amount by which the laser turns, but determining the number of laser probes, from which it can be determined the amount by which the laser turns, may be considered as an example of G-PCC decoder 300 determining the amount by which the laser turns.

As another example, to determine the amount by which the laser turns, G-PCC decoder 300 may determine a unit change in azimuth angle by which the laser turns (e.g., for a geometry tree type being predictive tree coding). The unit change in azimuth angle may be an amount of azimuth angle by which the laser steps for producing samples. G-PCC decoder 300 may add one to the value of the received syntax element (e.g., geom_angular_azimuth_step_minus1) to determine the unit change in azimuth angle.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

As described in more detail below, the high-level syntax for G-PCC has multiple aspects where there may be technical benefits in the operation of G-PCC encoder 200 and G-PCC decoder 300 or reduction in bandwidth consumption with some refinements/improvements in the high-level syntax. For instance, this disclosure describes examples for removing redundancies and refining the high level syntax of G-PCC. The following example techniques may be employed independently or may be used in a combined way.

In the following text between <ADD> . . . </ADD> shows text being added to the syntax structure. Text between <DELETE> . . . </DELETE> shows text being deleted from the syntax structure.

The following describes a minimum value for laser_phi_per_turn[0]. Currently, azimuth coding (e.g., using octree coder) defines the number of laser probes in one single rotation. The syntax laser_phi_per_turn[0] indicates a number of probes for laser 0. The corresponding value for laser_phi_per_turn[0] may not be zero (as it would nullify the use of azimuth coding). In one or more examples, G-PCC encoder 200 may signal and G-PCC decoder 300 may receive laser_phi_per_turn_minus1[0] for i=0 instead of laser_phi_per_turn[0], as shown in the below syntax structure.

| | |
|---|---|
| geometry_angular_enabled_flag | u(1) |
| if( geometry_angular_enabled_flag ){ | |
|   if( geom_tree_type == 1 ) { | |
|     geom_angular_azimuth_scale_log2 | ue(v) |
|     geom_angular_azimuth_step | ue(v) |
|     geom_angular_radius_scale_log2 | ue(v) |
|   } | |
|   for( k = 0; k < 3; k++ ) | |
|     geom_angular_origin_xyz[ k ] | se(v) |
|   number_lasers_minus1 | ue(v) |
|   laser_angle[ 0 ] | se(v) |
|   laser_correction[ 0 ] | se(v) |
|   if( geom_tree_type == 0 ) | |
|     laser_phi_per_turn_<ADD>minus1</ADD>[ 0 ] | ue(v) |
|   for( i = 1; i <= number_lasers_minus1; i++ ) { | |
|     laser_angle_diff[ i ] | se(v) |
|     laser_correction_diff[ i ] | se(v) |
|     if( geom_tree_type == 0 ) | |
|       laser_phi_per_turn_diff[ i ] | se(v) |
|   } | |
|   if( geom_tree_type == 0 ) | u(1) |
|     planar_buffer_disabled_flag | u(1) |
| } | |

Moreover, in some examples, it may not be describable to signal a value of 1 to indicate the number of laser probes, as that would indicate scanning at a particular azimuth direction and would nullify the effectiveness of azimuthal coding. In that case, it is also possible to signal laser_phi_per_turn_minus2[0] for i=0 instead. In this case, there may be the following update to bitstream conformance of having a minimum value of 2 for all other lasers: <ADD> It is a requirement of bitstream conformance that for i=1 . . . number_lasers_minus1, the value of LaserPhiPerTurn[i] shall not be less than 2. </ADD>.

The following describes minimum and maximum values for geom_angular_azimuth_step. geom_angular_azimuth_step specifies a unit change in azimuth angle. Differential prediction residuals used in angular predictive tree coding may be partially represented as multiples of geom_angular_azimuth_step. The minimum value a unit changes in azimuth angle may be 1; so G-PCC encoder 200 may signal and G-PCC decoder 300 may parse "_minus1" instead. Moreover, it is also proposed to have bitstream conformance: It is a requirement of bitstream conformance that, the value of geom_angular_azimuth_step_<ADD>minus1</ADD> shall not be more than (1<<geom_angular_azimuth_scale_log 2)-1.

| | |
|---|---|
| geometry_angular_enabled_flag | u(1) |
| if( geometry_angular_enabled_flag ){ | |
|   if( geom_tree_type == 1 ) { | |
|     geom_angular_azimuth_scale_log2 | ue(v) |
|     geom_angular_azimuth_step_<ADD>minus1</ADD> | ue(v) |
|     geom_angular_radius_scale_log2 | ue(v) |
|   } | |

Alternatively, it is also possible to have bitstream conformance both for minimum and maximum values, without modifying the syntax: <ADD> It is a requirement of bitstream conformance that the value of geom_angular_azimuth_step shall be in the range of 1 to (1<<geom_angular_azimuth_scale_log 2)</ADD>.

The following describes techniques regarding bitwise occupancy flag and planar mode. In G-PCC, bitwise_occupancy_coding_flag equal to 1 indicates that geometry node occupancy is encoded using bit-wise contextualisation of the syntax element occupancy_map. bitwise_occupancy_coding_flag equal to 0 indicates that geometry node occupancy is encoded using the dictionary encoded syntax element occupancy_byte.

However, currently when planar mode is enabled, there may be a requirement to perform bitwise coding, as the bytewise coding is incompatible. In one or more examples, G-PCC encoder 200 may signal and G-PCC decoder 300 may parse a bitwise occupancy flag only when planar mode is disabled, and when planar mode is enabled bitwise occupancy flag is inferred to be 1, and thus it is not needed to be signaled. The corresponding syntax and semantics change are as follows

| | |
|---|---|
| if( geom_tree_type == 0 ) { | |
|   geom_num_points_list_present_flag | u(1) |
|   trisoup_enabled_flag | u(1) |
|   if( !trisoup_enabled_flag ){ | |
|     unique_geometry_points_flag | u(1) |
|     inferred_direct_coding_mode | u(2) |
|     if( inferred_direct_coding_mode ) | |
|       joint_2point_idcm_enabled_flag | u(1) |
|   } | |
|   geom_tree_coded_axis_list_present_flag | u(1) |
|   log2_neighbour_avail_boundary | ue(v) |
|   if ( log2_neighbour_avail_boundary > 0 ) { | |
|     adjacent_child_contextualization_enabled_flag | u(1) |
|     log2_intra_pred_max_node_size | ue(v) |
|   } | |
|   <DELETE> bitwise_occupancy_coding_flag </DELETE> | u(1) |
|   geometry_planar_enabled_flag | u(1) |
|   if( geometry_planar_enabled_flag ){ | |
|     geom_planar_th[ 0 ] | ue(v) |
|     geom_planar_th[ 1 ] | ue(v) |
|     geom_planar_th[ 2 ] | ue(v) |
|     if( inferred_direct_coding_mode ) | |
|       geom_planar_th_idcm | ue(v) |
|   } | |
|   <ADD> else | |
|     bitwise_occupancy_coding_flag </ADD> | u(1) |
|   } | |
| } | | bitwise_occupancy_coding_flag equal to 1 indicates that geometry node occupancy is encoded using bit-wise contextualisation of the syntax element ocupancy_map. bitwise_occupancy_coding_flag equal to 0 indicates that geometry node occupancy is encoded using the dictionary encoded syntax element occupancy_byte. When bitwise_occupancy_coding_flag is not present in the bitstream, it is inferred to be 1.

In some examples, there may be a bitstream conformance check such as: geometry_planar_enabled_flag equal to 1 indicates that the planar coding mode is activated. geometry_planar_enabled_flag equal to 0 indicates that the planar coding mode is not activated. <ADD> It is a requirement of bitstream conformance that when the value of geometry_planar_enabled_flag is equal to 1 the value of bitwise_occupancy_coding_flag shall be 1</ADD>.

The following description is regarding coding of geom_angular_origin. geom_angular_origin_xyz[k] specifies the k-th component of the (x, y, z) co-ordinate of the origin used in the processing of the angular coding mode. When not present, geom_angular_origin_x, geom_angular_origin_y, and geom_angular_origin_z are inferred to be 0.

However, in typical cases, the origin value may be large enough that se(v) coding may not be optimal. In one or more examples, G-PCC encoder 200 and G-PCC decoder 300 may use fixed length code (e.g., to encode or decode) with number of bits minus 1 signaled.

| | |
|---|---|
| if( geometry_angular_enabled_flag ){ | |
|   if( geom_tree_type == 1 ) { | |
|     geom_angular_azimuth_scale_log2 | ue(v) |
|     geom_angular_azimuth_step | ue(v) |
|     geom_angular_radius_scale_log2 | ue(v) |
|   } | |
|   <ADD> geom_angular_origin_bits_minus1 </ADD> | ue(v) |
|   for( k = 0; k < 3; k++ ) | |
|     geom_angular_origin_xyz[ k ] | <ADD>s(v)</ADD> |
|   number_lasers_minus1 | ue(v) |
|   laser_angle[ 0 ] | se(v) |
|   laser_correction[ 0 ] | se(v) |
|   if( geom_tree_type == 0 ) | |
|     laser_phi_per_turn[ 0 ] | ue(v) |
|   for( i = 1; i <= number_lasers_minus1; i++ ) { | |
|     laser_angle_diff[ i ] | se(v) |
|     laser_correction_diff[ i ] | se(v) |
|     if( geom_tree_type == 0 ) | |
|       laser_phi_per_turn_diff[ i ] | se(v) |
|   } | |
| } | |

<ADD> geom_angular_origin_bits_minus1</ADD> plus 1 specifies the number of bits used to represent the syntax element geom_angular_origin_xyz[k].

For example, assume that the syntax element used to indicate the amount by which the laser turns is a first syntax element. G-PCC encoder 200 may encode a second syntax element of the point cloud data indicative of number of bits used to represent a third syntax element of the point cloud data. The third syntax element of the point cloud data is indicative of a coordinate of an origin used in processing of angular coding mode. G-PCC encoder 200 may fixed-length encode the third syntax element.

For instance, G-PCC encoder 200 may encode geom_angluar_origin_bits_minus1 (e.g., second syntax element from above example), which is indicative of the number of bits used to generate geom_angular_origin_xyz[k] (e.g., third syntax element in above example). In this example, G-PCC encoder 200 may fixed-length encode geom_angular_origin_xyz[k].

Similarly, G-PCC decoder 300 may decode a second syntax element of the point cloud data indicative of a number of bits used to represent a third syntax element of the point cloud data. The third syntax element of the point cloud data is indicative of a coordinate of an origin used in processing of angular coding mode. G-PCC decoder 300 may fixed-length decode the third syntax element.

For instance, G-PCC decoder 300 may decode geom_angular_origin_bits_minus1 (e.g., second syntax element from above example), which is indicative of the number of bits used to generate geom_angular_origin_xyz[k] (e.g., third syntax element in above example). In this example, G-PCC decoder 300 may fixed-length decode geom_angular_origin_xyz[k].

The following describes examples regarding coding of trisoup node size in slice header. Currently, for trisoup coding, there is a geometry parameter set (GPS) level flag to indicate if trisoup is enabled. If trisoup is enabled, then at the slice/data-unit header level, trisoup node size log 2 is signaled. The syntax and semantics are as follows.

trisoup_enabled_flag equal to 1 specifies that the trisoup coding is used in the bitstream. trisoup_enabled_flag equal to 0 specifies that no trisoup coding is used in the bitstream. When not present, the value of trisoup_enabled_flag is inferred to be 0.

Geometry Parameter Set:

```
if( geom_tree_type == 0 ) {
    geom_num_points_list_present_flag          u(1)
    trisoup_enabled_flag                       u(1)
    if( !trisoup_enabled_flag ){
        unique_geometry_points_flag            u(1)
        inferred_direct_coding_mode            u(2)
        if( inferred_direct_coding_mode )
            joint_2point_idcm_enabled_flag     u(1)
}
``` log 2_trisoup_node_size specifies the variable TrisoupNodeSize as the size of the triangle nodes as follows. When not present, the value of log 2_trisoup_node_size is inferred to be equal to 0.
TrisoupNodeSize=1<<log 2_trisoup_node_size
Geometry Slice/Data-Unit Header:

```
if( trisoup_enabled_flag ) {
    log2_trisoup_node_size                     ue(v)
    trisoup_sampling_value_minus1              ue(v)
    num_unique_segments_bits_minus1            ue(v)
    num_unique_segments_minus1                 u(v)
}
```

However, if trisoup is enabled from GPS, log 2_trisoup_node_size may not be zero. Accordingly, G-PCC encoder 200 may signal and G-PCC decoder 300 may parse "_minus1" instead. Modified syntax and semantics are as follows:

```
if( trisoup_enabled_flag ) {
    log2_trisoup_node_size_<ADD>minus1 </ADD>  ue(v)
    trisoup_sampling_value_minus1              ue(v)
    num_unique_segments_bits_minus1            ue(v)
    num_unique_segments_minus1                 u(v)
}
``` log 2_trisoup_node_size_minus1 plus1 specifies the variable TrisoupNodeSize as the size of the triangle nodes as follows. When not present, the value of TrisoupNodeSize is inferred to be equal to 1. TrisoupNodeSize=1<<(log 2_trisoup_node_size_minus1+1)

In some examples, if possible to have log 2_trisoup_node_size=0, G-PCC encoder 200 may signal and G-PCC decoder 300 may parse trisoup associated syntax elements when log 2_trisoup_node_size>0.

```
if( trisoup_enabled_flag ) {
    log2_trisoup_node_size                     ue(v)
    if(log2_trisoup_node_size){
        trisoup_sampling_value_minus1          ue(v)
        num_unique_segments_bits_minus1        ue(v)
        num_unique_segments_minus1             u(v)
    }
}
```

The following describes moving laser-intrinsics to a parameter set other than geometry parameter set (GPS), such as a sequence parameter set (SPS). Currently, the laser intrinsics are signaled in GPS, and it has the most signaling cost among all syntax parameters in GPS. However, laser intrinsics may be a sequence level property. For example, when a sequence is captured with a LiDAR system, the laser intrinsics are likely to be the same across different frames. In some examples, it may be possible to use it as sequence-level information, and thus laser intrinsics may be moved to the SPS. In some examples, when multiple GPS need to be sent (e.g., due to QP change across the frames), it may be cheaper (e.g., less bandwidth intensive) as the laser intrinsics may not be part of the GPS. The change in syntax and semantics is as follows.

| | Descriptor |
|---|---|
| seq_parameter_set( ) { | |
|   main_profile_compatibility_flag | u(1) |
|   reserved_profile_compatibility_21bits | u(21) |
|   slice_reordering_constraint_flag | u(1) |
|   unique_point_positions_constraint_flag | u(1) |
|   level_idc | u(8) |
|   sps_seq_parameter_set_id | ue(v) |
|   sps_bounding_box_present_flag | u(1) |
|   if( sps_bounding_box_present_flag ) { | |
|     sps_bounding_box_offset_bits_minus1 | ue(v) |
|     for( k = 0; k < 3; k++ ) | |
|       sps_bounding_box_offset_xyz[ k ] | s(v) |
|     sps_bounding_box_offset_log2_scale | ue(v) |
|     sps_bounding_box_size_bits_minus1 | ue(v) |
|     for( k = 0; k < 3; k++ ) | |
|       sps_bounding_box_size_minus1_xyz[ k ] | u(v) |
|   } | |
|   sps_source_scale_factor_numerator_minus1 | ue(v) |
|   sps_source_scale_factor_denominator_minus1 | ue(v) |
|   sps_global_scale_factor_log2 | ue(v) |
|   sps_global_scale_refinement_num_bits | ue(v) |
|   if( sps_global_scale_refinement_num_bits ) | |
|     global_scale_factor_refinement_factor | u(v) |
|   <ADD> sps_laser_intrinsics_present_flag | u(1) |
|   if(sps_laser_intrinsics_present_flag){ | |
|     laser_phi_per_turn_present_flag | u(1) |
|     number_lasers_minus1 | ue(v) |
|     laser_angle[ 0 ] | se(v) |
|     laser_correction[ 0 ] | se(v) |
|     if( laser_phi_per_turn_present_flag ) | |
|       laser_phi_per_turn[ 0 ] | ue(v) |
|     for( i = 1; i <= number_lasers_minus1; i++ ) { | |
|       laser_angle_diff[ i ] | se(v) |
|       laser_correction_diff[ i ] | se(v) |
|       if( laser_phi_per_turn_present_flag ) | |
|         laser_phi_per_turn_diff[ i ] | se(v) |
|     } | |
|   } </ADD> | |
|   sps_num_attribute_sets | ue(v) |
|   for( i = 0; i < sps_num_attribute_sets; i++ ) { | |
|     attribute_dimension_minus1[ i ] | ue(v) |
|     attribute_instance_id[ i ] | ue(v) |
|     attribute_bitdepth_minus1[ i ] | ue(v) |
|     if(attribute_dimension_minus1[ i ] > 0 ) | |
|       attribute_secondary_bitdepth_minus1[ i ] | ue(v) |
|     known_attribute_label_flag[ i ] | u(1) |
|     if( known_attribute_label_flag[ i ] ) | |
|       known_attribute_label[ i ] | ue(v) |
|     else | |
|       attribute_label_oid[ i ] | oid(v) |
|     num_attribute_parameters | u(5) |
|     byte_alignment( ) | |
|     for( j = 0; j < num_attribute_parameters; j++ ) | |
|       seq_attribute_parameters( i ) | |
|   } | |
|   log2_max_frame_ctr | u(5) |
|   axis_coding_order | u(3) |
|   sps_bypass_stream_enabled_flag | u(1) |
|   sps_entropy_continuation_enabled_flag | u(1) |
|   sps_extension_flag | u(1) |
|   if( sps_extension_flag ) | |
|     while( more_data_in_byte_stream( ) ) | |
|       sps_extension_data_flag | u(1) |
|   byte_alignment( ) | |
| } | |

| | Descriptor |
|---|---|
| geometry_parameter_set( ) { | |
|   gps_geom_parameter_set_id | ue(v) |
|   gps_seq_parameter_set_id | ue(v) |
|   gps_gsh_box_log2_scale_present_flag | u(1) |
|   if( !gps_gsh_box_log2_scale_present flag) | |
|     gps_gs_box_log2_scale | ue(v) |
|   geom_tree_type | u(1) |
|   if( geom_tree_type == 1 ) | |
|     unique_geometry_points_flag | u(1) |
|   if( geom_tree_type == 0 ) { | |
|     geom_num_points_list_present_flag | u(1) |
|     trisoup_enabled_flag | u(1) |
|     if( !trisoup_enabled_flag ){ | |
|       unique_geometry_points_flag | u(1) |
|       inferred_direct_coding_mode | u(2) |
|       if( inferred_direct_coding_mode ) | |
|         joint_2point_idcm_enabled_flag | u(1) |
|     } | |
|     geom_tree_coded_axis_list_present_flag | u(1) |
|     log2_neighbour_avail_boundary | ue(v) |
|     if ( log2_neighbour_avail_boundary > 0 ) { | |
|       adjacent_child_contextualization_enabled_flag | u(1) |
|       log2_intra_pred_max_node_size | ue(v) |
|     } | |
|     bitwise_occupancy_coding_flag | u(1) |
|     geometry_planar_enabled_flag | u(1) |
|     if( geometry_planar_enabled_flag ){ | |
|       geom_planar_th[ 0 ] | ue(v) |
|       geom_planar_th[ 1 ] | ue(v) |
|       geom_planar_th[ 2 ] | ue(v) |
|       if( inferred_direct_coding_mode ) | |
|         geom_planar_th_idcm | ue(v) |
|     } | |
|   } | |
|   geometry_angular_enabled_flag | u(1) |
|   if( geometry_angular_enabled_flag ){ | |
|     if( geom_tree_type == 1 ) { | |
|       geom_angular_azimuth_scale_log2 | ue(v) |
|       geom_angular_azimuth_step | ue(v) |
|       geom_angular_radius_scale_log2 | ue (v) |
|     } | |
|     for( k = 0; k < 3; k++ ) | |
|       geom_angular_origin_xyz[ k ] | se (v) |
|     <DELETE> number_lasers_minus1 | ue (v) |
|     laser_angle[ 0 ] | se (v) |
|     laser_correction[ 0 ] | se (v) |
|     if( geom_tree_type = = 0 ) | |
|       laser_phi_per_turn[ 0 ] | ue (v) |
|     for( i = 1; i <= number_lasers_minus1; i++ ) { | |
|       laser_angle_diff[ i ] | se (v) |
|       laser_correction_diff[ i ] | se (v) |
|       if( geom_tree_type = = 0 ) | |
|         laser_phi_per_turn_diff[ i ] | se (v) |
|     } | |
|     if( geom_tree_type = = 0 ) | u(1) |
|       planar_buffer_disabled_flag | u(1) |
| | </DELETE> |
|   } | |
|   geom_scaling_enabled_flag | u(1) |
|   if( geom_scaling_enabled_flag ) { | |
|     geom_base_qp | ue (v) |
|     geom_qp_multiplier_log2 | u(2) |
|     if( geom_tree_type = = 1 ) | |
|       geom_qp_offset_intvl_log2 | ue (v) |
|     else if( inferred_direct_coding_mode_enabled_flag ) | |
|       geom_direct_coding_mode_qp_offset | se (v) |
|   } | |
|   gps_extension_flag | u(1) |
|   if( gps_extension_flag ) | |
|     while( more_data_in_byte_stream( ) ) | |
|       gps_extension_data_flag | u(1) |
|   byte_alignment( ) | |
| } | |

<ADD> sps_laser_intrinsics_present_flag equal to 1 indicates that the laser intrinsics are present in the bitstream. sps_laser_intrinsics_present_flag equal to 0 indicates that the laser intrinsics are not present in the bitstream </ADD>.

<ADD> laser_phi_per_turn_present_flag equal to 1 indicates that the information of the number of samples produced by different lasers of a rotating sensing system are present in the bitstream. laser_phi_per_turn_present_flag equal to 0 indicates that such information is not present. </ADD>. The semantic meaning of other parameters existing in the GPS may not change.

In some examples, when angular mode is enabled from the GPS, the laser information may need to be present in the bitstream. When octree coding is enabled, laser_phi_per_turn_present flag may (e.g., shall) be equal to 1. The bitstream conformance can be presented as follows: <ADD> It is a requirement of bitstream conformance that when the value of geometry_angular_enabled_flag is equal to 1 the value of sps_laser_intrinsic_spresent_flag shall be equal to 1. It is a requirement of bitstream conformance that when the value of geometry_angular_enabled_flag is equal to 1 and the value of geom_tree_type is equal to 1 the value of laser_phi_per_turn_present_flag shall be equal to 1</ADD>.

The value of sps_laser_intrinsics_present_flag can also be conditioned on the profile (or alternatively, a bitstream conformance may be imposed), as some profile may not support angular mode; hence such laser intrinsics may not be useful.

In some examples, a list of laser intrinsic parameters may be signaled in the SPS and an index to the list of laser intrinsic parameters may be signaled in the GPS to specify which laser intrinsic parameter applies to the current GPS. When more than one laser intrinsic parameter is signaled in the SPS, the values signaled for parameters for one set may be derived from a parameter of a second set. For example, if Param1 and Param2 are a set of laser intrinsic parameters signaled in the SPS, then a value of Param2 may be delta-coded by the corresponding parameter in Param1.

The following describes a minimum value of scaling for spherical coordinate conversion. When spherical co-ordinate conversion is enabled for attribute coding, the scale values for all three axes are signaled. The minimum scaling value may be 1. Accordingly, G-PCC encoder 200 may signal and G-PCC decoder 300 may parse "_minus1" instead. The syntax and semantics modification are as follows:

| | Descriptor |
|---|---|
| attribute_data_unit_header( ) { | |
|   ash_attr_parameter_set_id | ue(v) |
|   ash_attr_sps_attr_idx | ue(v) |
|   ash_attr_geom_slice_id | ue(v) |
|   if ( aps_spherical_coord_conv_flag ) | |
|     for( k = 0; k <3; k++ ) | |
|       attr_spherical_coord_conv_scale_<ADD>minus1</ADD>[ k ] | ue(v) |

In case if scaling value for some axes are permitted to be 0, not all the scale value may be equal to zero. Accordingly, a bitstream conformance may be imposed: <ADD> It is a requirement of bitstream conformance that attr_spherical_coord_conv_scale[0], attr_spherical_coord_conv_scale[1] and attr_spherical_coord_conv_scale[2] shall not be all equal to 0</ADD>.

The following describes a minimum value of abs_log 2_bits for predictive geometry coding. ptn_residual_abs_log 2_bits_s, ptn_residual_abs_log 2_bits_delta_t, and ptn_residual_abs_log 2_bits_delta_v together specify the number of bins used to code the syntax element ptn_residual_abs_log 2.

The array PtnResidualAbsLog2Bits is derived as follows:
PtnResidualAbsLog2Bits[0]=ptn_residual_abs_log 2_bits_s
PtnResidualAbsLog2Bits[1]=ptn_residual_abs_log
2_bits_delta_t+PtnResidualAbsLog2Bits[0]
PtnResidualAbsLog2Bits[2]=ptn_residual_abs_log
2_bits_delta_v+PtnResidualAbsLog2Bits[1].

The following are examples of bitstream conformance for PtnResidualAbsLog2Bits[1] and PtnResidualAbsLog2Bits[2] to have a positive value.

<ADD> It is a requirement of bitstream conformance that both PtnResidualAbsLog2Bits[1] and PtnResidualAbsLog2Bits[1] shall be greater than 0</ADD>. In case, a value of zero is permitted: <ADD> It is a requirement of bitstream conformance that both PtnResidualAbsLog2Bits[1] and PtnResidualAbsLog2Bits[1] shall not be less than 0</ADD>.

The following describes attribute position scaling in coordinate conversion. When spherical coordinate conversion is used for coding the attributes, a coordinate scale value is signalled as follows for each coordinate. A recent draft of the G-PCC specification has signalling as follows:

```
if( aps_coord_conv_flag )
    for( k = 0; k < 3; k++ ) {
        attr_coord_conv_scale_bits_minus1[ k ]      u(5)
        attr_coord_conv_scale[ k ]                   u(v)
    }
```

The semantics of the syntax elements are as follows: attr_coord_conv_scale_bits_minus1[k] plus 1 is the length in bits of the syntax element attr_coord_conv_scale[k], and attr_coord_conv_scale[k] specifies the scale factor of the converted coordinate axis in units of $2^{-8}$.

The coordination conversion scale values are used as follows, and may be part of 8.3.3.2 Scaling Spherical coordinate.

XXX scales AttrPos.

When geom_tree_type is equal to 0, the array minSph is derived as follows:

```
for (k = 0; k < 3; k++){
    minSph[ k ] = PointSph[0][k]
    for(i = 1; i < PointCount; i++)
        minSph[k] = Min(minSph[k], PointSph[i][k])
}
```

Otherwise (geom_tree_type equal to 1), the array minSph is initialized as follows:

```
minSph[0] = 0
minSph[1] = -(1 << geom_angular_azimuth_scale_log2_mi-
nus11 + 10)
minSph[2] = 0
Finally, AttrPos[ i ][ k ] is derived as follows:
for (i = 0; i < PointCount; i++)
    for (k = 0; k < 3; k++) {
        relPos = Max(0, PointSph[i][k] – minSph[k])
        AttrPos[i][k] = relPos × attr_coord_conv_scale[k] + 128 >> 8
    }
```

The attr_coord_conv_scale[ ] values could be up to 32 bits and the result (or an intermediate values in its calculation) of "relPos×attr_coord_conv_scale[k]+128>>8" may exceed 32 bits. In some examples, it may be desirable to keep the geometry computations within 32 bits because exceeding 32 bits even for temporary variables/intermediate results may increase the cost and complexity of implementing spherical coordinate conversion.

In some examples, it may be possible to clip the value of AttrPos[i][k] or an intermediate value (e.g., relPos×attr_coord_conv_scale[k]+128) to 32 bits. In some examples, it may be possible to require that that the value of AttrPos[i][k] or an intermediate value (e.g., relPos×attr_coord_conv_scale[k]+128) be less than or equal to a fixed value (e.g., $2^{32}-1$). Bitstreams that violate this constraint may be considered non-conformant, or in some cases ignored by G-PCC decoder 300.

For example, G-PCC encoder 200 may be configured to determine a value associated with attribute position in spherical coordinate conversion that does not exceed 32 bits. For instance, AttrPos[i][k] or an intermediate value is not to have a bit depth that is more than 32 bits. As one example, to determine the value, G-PCC encoder 200 may be configured to at least one of clip the value to be less than or equal to 32 bits, and generate the value in conformance with a point cloud compression standard that defines that a bit depth of the value is less than or equal to 32 bits (e.g., generate the value so that the value is conforms to the G-PCC standard).

Similarly, G-PCC decoder 300 may be configured to determine a value associated with attribute position in spherical coordinate conversion that does not exceed 32 bits. Same as above, AttrPos[i][k] or an intermediate value is not to have a bit depth that is more than 32 bits. As one example, to determine the value, G-PCC decoder 300 may be configured to at least one of clip the value to be less than or equal to 32 bits, and receive the value in conformance with a point cloud compression standard that defines that a bit depth of the value is less than or equal to 32 bits (e.g., receive the value that conforms to the G-PCC standard).

Figure 4:
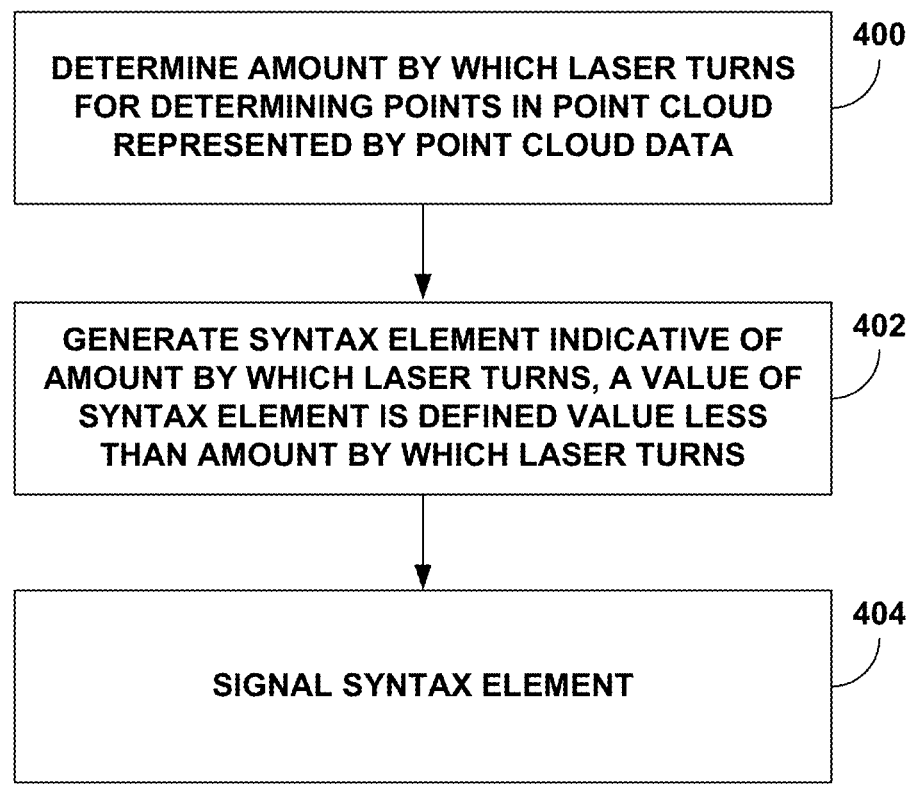
FIG. 4 is a flowchart illustrating an example of encoding point cloud data.

FIG. 4 is a flowchart illustrating an example of encoding point cloud data. The example of FIG. 4 may be performed by a device for encoding point cloud data. Examples of the device include source device 102 or G-PCC encoder 200. The device include memory configured to store the point cloud data. Examples of the memory include memory 106 or memory of G-PCC encoder 200. The device also includes one or more processors coupled to the memory. The one or more processors may be the one or more processors of source device 102 that include G-PCC encoder 200. As another example, the one or more processors may be the processors of G-PCC encoder 200. The one or more processors may include fixed-function and/or programmable circuitry.

The one or more processors (e.g., G-PCC encoder 200) may be configured to determine an amount by which a laser turns for determining points in a point cloud represented by the point cloud data (400). As one example, to determine the amount by which the laser turns, the one or more processors of G-PCC encoder 200 may be configured to determine a number of laser probes by the laser in one single rotation. The one or more processors of G-PCC encoder 200 may determine the number of laser probes by the laser in one single rotation for a geometry tree type being octree coding (e.g., geom_tree_type=0). The number of laser probes by the laser in one single rotation of the laser may refer to the number of samples produced by the laser of a rotating sensing system located at the origin.

As another example, to determine the amount by which the laser turns, the one or more processors of G-PCC encoder 200 may determine a unit change in azimuth angle by which the laser turns. The one or more processors of G-PCC encoder 200 may determine the unit change in azimuth angle by which the laser turns for a geometry tree type being predictive geometry coding (e.g., geom_tree_type=1). The unit change in azimuth angle by which the laser turns may be an amount of azimuth angle by which the laser steps for producing the samples.

The one or more processors of G-PCC encoder 200 may generate a syntax element indicative of the amount by which the laser turns, where a value of the syntax element is a defined value less than the amount by which the laser turns (402). For example, to generate the syntax element, the one or more processors of G-PCC encoder 200 may subtract the defined value from the amount by which the laser turns to generate the value of the syntax element. The defined value may be equal to 1. One example of the syntax element is laser_phi_per_turn_minus1 (e.g., for octree coding). Another example of the syntax element is geom_angular_azimuth_step_minus1 (e.g., for predictive geometry coding).

The one or more processors of G-PCC encoder 200 may signal the syntax element (404). For instance, the one or more processors of G-PCC encoder 200 may signal laser_phi_per_turn_minus1 or geom_angular_azimuth_step_minus1 based on whether the geometry tree type is octree coding or predictive geometry coding (also called predictive tree coding).

Figure 5:
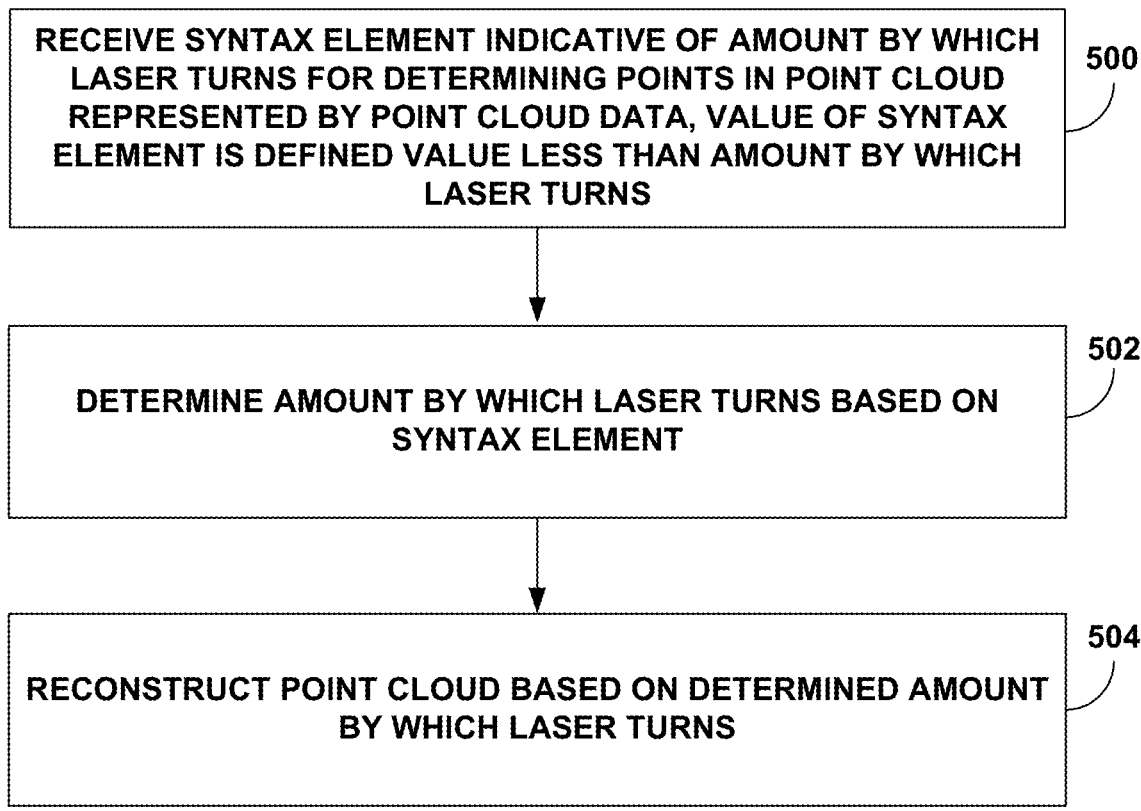
FIG. 5 is a flowchart illustrating an example of decoding point cloud data.

FIG. 5 is a flowchart illustrating an example of decoding point cloud data. The example of FIG. 5 may be performed by a device for decoding point cloud data. Examples of the device include destination device 116 or G-PCC decoder 300. The device include memory configured to store the point cloud data. Examples of the memory include memory 120 or memory of G-PCC decoder 300. The device also includes one or more processors coupled to the memory. The one or more processors may be the one or more processors of destination device 116 that include G-PCC decoder 300. As another example, the one or more processors may be the processors of G-PCC decoder 300. The one or more processors may include fixed-function and/or programmable circuitry.

The one or more processors of G-PCC decoder 300 may receive a syntax element indicative of an amount by which a laser turns for determining points in a point cloud represented by the point cloud data, where a value of the syntax element is a defined value less than the amount by which the laser turns (500). For instance, the one or more processors of G-PCC decoder 300 may receive the laser_phi_per_turn_minus1 syntax element or the geom_angular_azimuth_step_minus1 syntax element.

The one or more processors of G-PCC decoder 300 may determine the amount by which the laser turns based on the syntax element (502). For example, to determine the amount by which the laser turns based on the syntax element, the one or more processors of G-PCC decoder 300 may add the defined value to the value of the syntax element. In an example, the defined value may be 1.

As one example, to determine the amount by which the laser turns, the one or more processors of G-PCC decoder 300 may be configured to determine a number of laser probes by the laser in one single rotation. The one or more processors of G-PCC decoder 300 may determine the number of laser probes by the laser in one single rotation for a geometry tree type being octree coding (e.g., geom_tree_type=0). The number of laser probes by the laser in one single rotation of the laser may refer to the number of samples produced by the laser of a rotating sensing system located at the origin.

As another example, to determine the amount by which the laser turns, the one or more processors of G-PCC decoder 300 may determine a unit change in azimuth angle by which the laser turns. The one or more processors of G-PCC decoder 300 may determine the unit change in azimuth angle by which the laser turns for a geometry tree type being predictive geometry coding (e.g., geom_tree_type=1). The unit change in azimuth angle by which the laser turns may be an amount of azimuth angle by which the laser steps for producing the samples.

The one or more processors of G-PCC decoder 300 may reconstruct the point cloud based on the determined amount by which the laser turns (504). For example, the laser_phi_per_turn_minus1 syntax element or the geom_angular_azimuth_step_minus1 syntax element indicate an amount of rotation associated with the laser (e.g., a spinning LiDAR scanning in a 3D environment). The amount of rotation associated with the laser may be indicative of where points in the point cloud are located, and may therefore be useable for reconstructing the point cloud.

The following provides some examples of techniques that may be performed separately or together in any combination.

Clause 1A. A method of decoding point cloud data, the method comprising receiving a syntax element indicative of a number of laser probes, wherein a value of the syntax element is a defined value less than the number of laser probes; and decoding the point cloud data based on the received syntax element.

Clause 2A. A method of encoding point cloud data, the method comprising determining a number of laser probes for encoding the point cloud data; and signaling a syntax element indicative of the number of laser probes, wherein a value of the syntax element is a defined value less than the number of laser probes.

Clause 3A. The method of any of clauses 1A and 2A, wherein the defined value is one of 1 or 2.

Clause 4A. A method of decoding point cloud data, the method comprising receiving a syntax element indicative of a unit change in azimuth angle, wherein a value of the syntax element is a defined value less than the unit change in azimuth angle; and decoding the point cloud data based on the received syntax element.

Clause 5A. A method of encoding point cloud data, the method comprising determining a unit change in azimuth angle for encoding the point cloud data; and signaling a syntax element indicative of the unit change in azimuth angle, wherein a value of the syntax element is a defined value less than the unit change in azimuth angle.

Clause 6A. The method of any of clauses 4A and 5A, wherein the defined value is 1.

Clause 7A. A method of decoding point cloud data, the method comprising in a first instance, determining that planar mode for decoding the point cloud data is disabled; in the first instance, parsing a syntax element indicative of whether geometry node occupancy is encoded using bitwise contextualization; in a second instance, determining that planar mode for decoding the point cloud data is enabled; in the second instance, inferring, without parsing, whether geometry node occupancy is encoded using bitwise contextualization.

Clause 8A. A method of encoding point cloud data, the method comprising in a first instance, determining that planar mode for decoding the point cloud data is disabled; in the first instance, signaling a syntax element indicative of whether geometry node occupancy is encoded using bitwise contextualization; in a second instance, determining that planar mode for decoding the point cloud data is enabled; in the second instance, bypass signaling the syntax element indicative of whether geometry node occupancy is encoded using bitwise contextualization.

Clause 9A. A method of decoding point cloud data, the method comprising fixed-length decoding a first syntax element of the point cloud data indicative of number of bits used represent a second syntax element of the point cloud data indicative of a coordinate of an origin used in processing of angular coding mode.

Clause 10A. A method of encoding point cloud data, the method comprising fixed-length encoding a first syntax element of the point cloud data indicative of number of bits used represent a second syntax element of the point cloud data indicative of a coordinate of an origin used in processing of angular coding mode.

Clause 11A. A method of decoding point cloud data, the method comprising receiving a syntax element indicative of size of triangle nodes, wherein a value of the syntax element is a defined value less than the size of triangle nodes; and decoding the point cloud data based on the received syntax element.

Clause 12A. A method of encoding point cloud data, the method comprising determining a size of triangle nodes for encoding the point cloud data; and signaling a syntax element indicative of the size of triangle nodes, wherein a value of the syntax element is a defined value less than the unit change in azimuth angle.

Clause 13A. A method of decoding point cloud data, the method comprising parsing, in a parameter set other than a geometry parameter set, a syntax element indicative of whether laser intrinsics are present in a bitstream.

Clause 14A. A method of encoding point cloud data, the method comprising signaling, in a parameter set other than a geometry parameter set, a syntax element indicative of whether laser intrinsics are present in a bitstream.

Clause 15A. The method of any of clauses 13 and 14, wherein the parameter set comprises a sequence parameter set.

Clause 16A. A method of decoding point cloud data, the method comprising receiving a syntax element indicative of a scaling factor value for spherical coordinate conversion, wherein a value of the syntax element is a defined value less than the scaling factor value; and decoding the point cloud data based on the received syntax element.

Clause 17A. A method of encoding point cloud data, the method comprising determining a scaling factor value for encoding the point cloud data; and signaling a syntax element indicative of the scaling factor value, wherein a value of the syntax element is a defined value less than the scaling factor value.

Clause 18A. The method of any of clauses 16 and 17, wherein the defined value is 1.

Clause 19A. A device for decoding point cloud data, the device comprising a memory configured to store point cloud data, and processing circuitry coupled to the memory and configured to perform the method of any one or combination of clauses 1A, 3A, 4A, 6A, 7A, 9A, 11A, 13A, 15A, 16A, and 18A.

Clause 20A. The device of clause 19A, further comprising a display to present imagery based on the point cloud.

Clause 21A. A device for encoding point cloud data, the device comprising a memory configured to store point cloud data; and processing circuitry coupled to the memory and configured to perform the method of any one or combination of clauses 2A, 3A, 5A, 6A, 8A, 10A, 12A, 14A, 15A, 17A, and 18A.

Clause 22A. The device of clause 21A, further comprising a device to generate the point cloud.

Clause 23A. A device for decoding point cloud data, the device comprising means for performing the method of any one or combination of clauses 1A, 3A, 4A, 6A, 7A, 9A, 11A, 13A, 15A, 16A, and 18A.

Clause 24A. A device for encoding point cloud data, the device comprising means for performing the method of any one or combination of clauses 2A, 3A, 5A, 6A, 8A, 10A, 12A, 14A, 15A, 17A, and 18A.

Clause 25A. A computer-readable storage medium storing instructions thereon that when executed cause one or more processors to perform the method of any one or combination of clauses 1A, 3A, 4A, 6A, 7A, 9A, 11A, 13A, 15A, 16A, and 18A.

Clause 26A. A computer-readable storage medium storing instructions thereon that when executed cause one or more processors to perform the method of any one or combination of clauses 2A, 3A, 5A, 6A, 8A, 10A, 12A, 14A, 15A, 17A, and 18A.

Clause 1B. A method of encoding point cloud data, the method comprising: determining an amount by which a laser turns for determining points in a point cloud represented by the point cloud data; generating a syntax element indicative of the amount by which the laser turns, wherein a value of the syntax element is a defined value less than the amount by which the laser turns; and signaling the syntax element.

Clause 2B. The method of clause 1B, wherein determining the amount by which the laser turns comprises determining a number of laser probes by the laser in one single rotation.

Clause 3B. The method of clause 2B, wherein determining the number of laser probes by the laser in one single rotation comprises determining the number of laser probes by the laser in one single rotation for a geometry tree type being octree coding.

Clause 4B. The method of clause 1B, wherein determining the amount by which the laser turns comprises determining a unit change in an azimuth angle by which the laser turns.

Clause 5B. The method of clause 4B, wherein determining the unit change in the azimuth angle by which the laser turns comprises determining the unit change in the azimuth angle by which the laser turns for a geometry tree type being predictive geometry coding.

Clause 6B. The method of any of clauses 1B-5B, wherein generating the syntax element comprises subtracting the defined value from the amount by which the laser turns to generate the value of the syntax element.

Clause 7B. The method of any of clauses 1B-6B, wherein the defined value is equal to 1.

Clause 8B. The method of any of clauses 1B-7B, wherein the syntax element is a first syntax element, the method further comprising: encoding a second syntax element of the point cloud data indicative of number of bits used to represent a third syntax element of the point cloud data, wherein the third syntax element of the point cloud data is indicative of a coordinate of an origin used in processing of an angular coding mode; and fixed-length encoding the third syntax element.

Clause 9B. The method of any of clauses 1B-8B, wherein the value comprises a first value, the method further comprising: determining a second value associated with attribute position in spherical coordinate conversion that does not exceed 32 bits, wherein determining the second value comprises at least one of: clipping the second value to be less than or equal to 32 bits; and generating the second value in conformance with a point cloud compression standard that defines that a bit depth of the value is less than or equal to 32 bits.

Clause 10B. A method of decoding point cloud data, the method comprising: receiving a syntax element indicative of an amount by which a laser turns for determining points in a point cloud represented by the point cloud data, wherein a value of the syntax element is a defined value less than the amount by which the laser turns; determining the amount by which the laser turns based on the syntax element; and reconstructing the point cloud based on the determined amount by which the laser turns.

Clause 11B. The method of clause 10B, wherein determining the amount by which the laser turns based on the syntax element comprises determining a number of laser probes by the laser in one single rotation.

Clause 12B. The method of clause 11B, wherein determining the number of laser probes by the laser in one single rotation comprises determining the number of laser probes by the laser in one single rotation for a geometry tree type being octree coding.

Clause 13B. The method of clause 10B, wherein determining the amount by which the laser turns based on the syntax element comprises determining a unit change in an azimuth angle by which the laser turns.

Clause 14B. The method of clause 13B, wherein determining the unit change in the azimuth angle by which the laser turns comprises determining the unit change in the azimuth angle by which the laser turns for a geometry tree type being predictive geometry coding.

Clause 15B. The method of any of clauses 10B-14B, wherein determining the amount by which the laser turns based on the syntax element comprises adding the defined value to the value of the syntax element.

Clause 16B. The method of any of clauses 10B-15B, wherein the defined value is equal to 1.

Clause 17B. The method of any of clauses 10B-16B, wherein the syntax element is a first syntax element, the method further comprising: decoding a second syntax element of the point cloud data indicative of number of bits used to represent a third syntax element of the point cloud data, wherein the third syntax element of the point cloud data is indicative of a coordinate of an origin used in processing of an angular coding mode; and fixed-length decoding the third syntax element.

Clause 18B. The method of any of clauses 10B-17B, wherein the value comprises a first value, the method further comprising: determining a second value associated with attribute position in spherical coordinate conversion that does not exceed 32 bits, wherein determining the second value comprises at least one of: clipping the second value to be less than or equal to 32 bits; and receiving the second value in conformance with a point cloud compression standard that defines that a bit depth of the value is less than or equal to 32 bits.

Clause 19B. A device for encoding point cloud data, the device comprising memory configured to store the point cloud data; and one or more processors coupled to the memory, wherein the one or more processors are configured to: determine an amount by which a laser turns for determining points in a point cloud represented by the point cloud data; generate a syntax element indicative of the amount by which the laser turns, wherein a value of the syntax element is a defined value less than the amount by which the laser turns; and signal the syntax element.

Clause 20B. The device of clause 19B, wherein determining the amount by which the laser turns comprises determining a number of laser probes by the laser in one single rotation.

Clause 21B. The device of clause 20B, wherein determining the number of laser probes by the laser in one single rotation comprises determining the number of laser probes by the laser in one single rotation for a geometry tree type being octree coding.

Clause 22B. The device of clause 19B, wherein determining the amount by which the laser turns comprises determining a unit change in an azimuth angle by which the laser turns.

Clause 23B. The device of clause 22B, wherein determining the unit change in the azimuth angle by which the laser turns comprises determining the unit change in the azimuth angle by which the laser turns for a geometry tree type being predictive geometry coding.

Clause 24B. The device of any of clauses 19B-23B, wherein generating the syntax element comprises subtracting the defined value from the amount by which the laser turns to generate the value of the syntax element.

Clause 25B. The device of any of clauses 19B-24B, wherein the defined value is equal to 1.

Clause 26B. The device of any of clauses 19B-25B, wherein the syntax element is a first syntax element, and wherein the one or more processors are configured to: encode a second syntax element of the point cloud data that is indicative of a number of bits used to represent a third syntax element of the point cloud data, wherein the third syntax element of the point cloud data is indicative of a coordinate of an origin used in processing of an angular coding mode; and fixed-length encode the third syntax element.

Clause 27B. A device for decoding point cloud data, the device comprising memory configured to store the point cloud data; and one or more processors coupled to the memory, wherein the one or more processors are configured to: receive a syntax element indicative of an amount by which a laser turns for determining points in a point cloud represented by the point cloud data, wherein a value of the syntax element is a defined value less than the amount by which the laser turns; determine the amount by which the laser turns based on the syntax element; and reconstruct the point cloud based on the determined amount by which the laser turns.

Clause 28B. The device of clause 27B, wherein determining the amount by which the laser turns based on the syntax element comprises determining a number of laser probes by the laser in one single rotation.

Clause 29B. The device of clause 28B, wherein determining the number of laser probes by the laser in one single rotation comprises determining the number of laser probes by the laser in one single rotation for a geometry tree type being octree coding.

Clause 30B. The device of clause 27B, wherein determining the amount by which the laser turns based on the syntax element comprises determining a unit change in an azimuth angle by which the laser turns.

Clause 31B. The device of clause 30B, wherein determining the unit change in the azimuth angle by which the laser turns comprises determining the unit change in the azimuth angle by which the laser turns for a geometry tree type being predictive geometry coding.

Clause 32B. The device of any of clauses 27B-31B, wherein determining the amount by which the laser turns based on the syntax element comprises adding the defined value to the value of the syntax element.

Clause 33B. The device of any of clauses 27B-32B, wherein the defined value is equal to 1.

Clause 34B. The device of any of clauses 27B-33B, wherein the syntax element is a first syntax element, and wherein the one or more processors are configured to: decode a second syntax element of the point cloud data that is indicative of a number of bits used to represent a third syntax element of the point cloud data, wherein the third syntax element of the point cloud data is indicative of a coordinate of an origin used in processing of angular coding mode; and fixed-length decode the third syntax element.

Clause 35B. A device for encoding point cloud data, the device comprising: means for determining an amount by which a laser turns for determining points in a point cloud represented by the point cloud data; means for generating a syntax element indicative of the amount by which the laser turns, wherein a value of the syntax element is a defined value less than the amount by which the laser turns; and means for signaling the syntax element.

Clause 36B. A computer-readable storage medium storing instructions thereon that when executed cause one or more processors to: determine an amount by which a laser turns for determining points in a point cloud represented by the point cloud data; generate a syntax element indicative of the amount by which the laser turns, wherein a value of the syntax element is a defined value less than the amount by which the laser turns; and signal the syntax element.

Clause 37B. A device for decoding point cloud data, the device comprising: means for receiving a syntax element indicative of an amount by which a laser turns for determining points in a point cloud represented by the point cloud data, wherein a value of the syntax element is a defined value less than the amount by which the laser turns; means for determining the amount by which the laser turns based on the syntax element; and means for reconstructing the point cloud based on the determined amount by which the laser turns.

Clause 38B. A computer-readable storage medium storing instructions thereon that when executed cause one or more processors to: receive a syntax element indicative of an amount by which a laser turns for determining points in a point cloud represented by the point cloud data, wherein a value of the syntax element is a defined value less than the amount by which the laser turns; determine the amount by which the laser turns based on the syntax element; and reconstruct the point cloud based on the determined amount by which the laser turns.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding point cloud data, the method comprising:
   determining, with one or more processors, an amount by which a laser turns for determining points in a point cloud represented by the point cloud data, wherein determining the amount by which the laser turns comprises one of:
      determining a number of laser probes by the laser in one single rotation; or
      determining a change in an azimuth angle by which the laser turns;
   generating, with the one or more processors, a syntax element indicative of the amount by which the laser turns for determining the points in the point cloud, wherein a value of the syntax element is a defined value less than the amount by which the laser turns, and wherein the defined value is 1; and
   signaling, with the one or more processors, the value of the syntax element.

2. The method of claim 1, wherein determining the amount by which the laser turns comprises determining the number of laser probes by the laser in one single rotation.

3. The method of claim 2, wherein determining the number of laser probes by the laser in one single rotation comprises determining the number of laser probes by the laser in one single rotation for a geometry tree type being octree coding.

4. The method of claim 1, wherein determining the amount by which the laser turns comprises determining the change in the azimuth angle by which the laser turns.

5. The method of claim 4, wherein determining the change in the azimuth angle by which the laser turns comprises determining the change in the azimuth angle by which the laser turns for a geometry tree type being predictive geometry coding.

6. The method of claim 1, wherein generating the syntax element comprises subtracting the defined value from the amount by which the laser turns to generate the value of the syntax element.

7. The method of claim 1, wherein the syntax element is a first syntax element, the method further comprising:
   encoding a second syntax element of the point cloud data that is indicative of a number of bits used to represent a third syntax element of the point cloud data, wherein the third syntax element of the point cloud data is indicative of a coordinate of an origin used in processing of an angular coding mode; and
   fixed-length encoding the third syntax element.

8. The method of claim 1, wherein the value comprises a first value, the method further comprising:
   determining a second value associated with attribute position in spherical coordinate conversion that does not exceed 32 bits, wherein determining the second value comprises at least one of:
   clipping the second value to be less than or equal to 32 bits; and
   generating the second value in conformance with a point cloud compression standard that defines that a bit depth of the value is less than or equal to 32 bits.

9. A method of decoding point cloud data, the method comprising:
   receiving, with one or more processors, a value of a syntax element indicative of an amount by which a laser turns for determining points in a point cloud represented by the point cloud data, wherein the value of the syntax element is a defined value less than the amount by which the laser turns, and wherein the defined value is 1;
   determining, with the one or more processors, the amount by which the laser turns for determining the points in the point cloud based on the syntax element, wherein determining the amount by which the laser turns comprises one of:
      determining a number of laser probes by the laser in one single rotation; or
      determining a change in an azimuth angle by which the laser turns; and
   reconstructing, with the one or more processors, the point cloud based on the determined amount by which the laser turns.

10. The method of claim 9, wherein determining the amount by which the laser turns based on the syntax element comprises determining the number of laser probes by the laser in one single rotation.

11. The method of claim 10, wherein determining the number of laser probes by the laser in one single rotation comprises determining the number of laser probes by the laser in one single rotation for a geometry tree type being octree coding.

12. The method of claim 9, wherein determining the amount by which the laser turns based on the syntax element comprises determining the change in the azimuth angle by which the laser turns.

13. The method of claim 12, wherein determining the change in the azimuth angle by which the laser turns comprises determining the change in the azimuth angle by which the laser turns for a geometry tree type being predictive geometry coding.

14. The method of claim 9, wherein determining the amount by which the laser turns based on the syntax element comprises adding the defined value to the value of the syntax element.

15. The method of claim 9, wherein the syntax element is a first syntax element, the method further comprising:
   decoding a second syntax element of the point cloud data that is indicative of a number of bits used to represent a third syntax element of the point cloud data, wherein the third syntax element of the point cloud data is indicative of a coordinate of an origin used in processing of an angular coding mode; and
   fixed-length decoding the third syntax element.

16. The method of claim 9, wherein the value comprises a first value, the method further comprising:
   determining a second value associated with attribute position in spherical coordinate conversion that does not exceed 32 bits, wherein determining the second value comprises at least one of:
   clipping the second value to be less than or equal to 32 bits; and
   receiving the second value in conformance with a point cloud compression standard that defines that a bit depth of the value is less than or equal to 32 bits.

17. A device for encoding point cloud data, the device comprising:
memory configured to store the point cloud data; and
one or more processors coupled to the memory, wherein the one or more processors are configured to:
determine an amount by which a laser turns for determining points in a point cloud represented by the point cloud data, wherein to determine the amount by which the laser turns, the one or more processors are configured to one of:
determine a number of laser probes by the laser in one single rotation; or
determine a change in an azimuth angle by which the laser turns;
generate a syntax element indicative of the amount by which the laser turns for determining the points in the point cloud, wherein a value of the syntax element is a defined value less than the amount by which the laser turns, and wherein the defined value is 1; and
signal the value of the syntax element.

18. The device of claim 17, wherein to determine the amount by which the laser turns, the one or more processors are configured to determine the number of laser probes by the laser in one single rotation.

19. The device of claim 18, wherein to determine the number of laser probes by the laser in one single rotation, the one or more processors are configured to determine the number of laser probes by the laser in one single rotation for a geometry tree type being octree coding.

20. The device of claim 17, wherein to determine the amount by which the laser turns, the one or more processors are configured to determine the change in the azimuth angle by which the laser turns.

21. The device of claim 20, wherein to determine the change in the azimuth angle by which the laser turns, the one or more processors are configured to determine the change in the azimuth angle by which the laser turns for a geometry tree type being predictive geometry coding.

22. The device of claim 17, wherein to generate the syntax element, the one or more processors are configured to subtract the defined value from the amount by which the laser turns to generate the value of the syntax element.

23. The device of claim 17, wherein the syntax element is a first syntax element, and wherein the one or more processors are configured to:
encode a second syntax element of the point cloud data that is indicative of a number of bits used to represent a third syntax element of the point cloud data, wherein the third syntax element of the point cloud data is indicative of a coordinate of an origin used in processing of an angular coding mode; and
fixed-length encode the third syntax element.

24. A device for decoding point cloud data, the device comprising:
memory configured to store the point cloud data; and
one or more processors coupled to the memory, wherein the one or more processors are configured to:
receive a value of a syntax element indicative of an amount by which a laser turns for determining points in a point cloud represented by the point cloud data, wherein the value of the syntax element is a defined value less than the amount by which the laser turns, and wherein the defined value is 1;
determine the amount by which the laser turns for determining the points in the point cloud based on the syntax element, wherein to determine the amount by which the laser turns, the one or more processors are configured to one of:
determine a number of laser probes by the laser in one single rotation; or
determine a change in an azimuth angle by which the laser turns; and
reconstruct the point cloud based on the determined amount by which the laser turns.

25. The device of claim 24, wherein to determine the amount by which the laser turns based on the syntax element, the one or more processors are configured to determine the number of laser probes by the laser in one single rotation.

26. The device of claim 25, wherein to determine the number of laser probes by the laser in one single rotation, the one or more processors are configured to determine the number of laser probes by the laser in one single rotation for a geometry tree type being octree coding.

27. The device of claim 24, wherein to determine the amount by which the laser turns based on the syntax element, the one or more processors are configured to determine the change in the azimuth angle by which the laser turns.

28. The device of claim 27, wherein to determine the change in the azimuth angle by which the laser turns, the one or more processors are configured to determine the change in the azimuth angle by which the laser turns for a geometry tree type being predictive geometry coding.

29. The device of claim 24, wherein to determine the amount by which the laser turns based on the syntax element, the one or more processors are configured to add the defined value to the value of the syntax element.

30. The device of claim 24, wherein the syntax element is a first syntax element, and wherein the one or more processors are configured to:
decode a second syntax element of the point cloud data that is indicative of a number of bits used to represent a third syntax element of the point cloud data, wherein the third syntax element of the point cloud data is indicative of a coordinate of an origin used in processing of angular coding mode; and
fixed-length decode the third syntax element.

31. A device for encoding point cloud data, the device comprising:
means for determining an amount by which a laser turns for determining points in a point cloud represented by the point cloud data, wherein the means for determining the amount by which the laser turns comprises one of:
means for determining a number of laser probes by the laser in one single rotation; or
means for determining a change in an azimuth angle by which the laser turns;
means for generating a syntax element indicative of the amount by which the laser turns for determining the points in the point cloud, wherein a value of the syntax element is a defined value less than the amount by which the laser turns, and wherein the defined value is 1; and
means for signaling the value of the syntax element.

32. A non-transitory computer-readable storage medium storing instructions thereon that when executed cause one or more processors to:
determine an amount by which a laser turns for determining points in a point cloud represented by point cloud data, wherein the instructions that cause the one or more processors to determine the amount by which the laser turns comprise instructions that cause the one or more processors to one of:

determine a number of laser probes by the laser in one single rotation; or determine a change in an azimuth angle by which the laser turns;

generate a syntax element indicative of the amount by which the laser turns for determining the points in the point cloud, wherein a value of the syntax element is a defined value less than the amount by which the laser turns, and wherein the defined value is 1; and signal the value of the syntax element.

33. A device for decoding point cloud data, the device comprising:

means for receiving a value of a syntax element indicative of an amount by which a laser turns for determining points in a point cloud represented by the point cloud data, wherein the value of the syntax element is a defined value less than the amount by which the laser turns, and wherein the defined value is 1;

means for determining the amount by which the laser turns for determining the points in the point cloud based on the syntax element, wherein the means for determining the amount by which the laser turns comprises one of:

means for determining a number of laser probes by the laser in one single rotation; or means for determining a change in an azimuth angle by which the laser turns; and means for reconstructing the point cloud based on the determined amount by which the laser turns.

34. A non-transitory computer-readable storage medium storing instructions thereon that when executed cause one or more processors to:

receive a value of a syntax element indicative of an amount by which a laser turns for determining points in a point cloud represented by point cloud data, wherein the value of the syntax element is a defined value less than the amount by which the laser turns, and wherein the defined value is 1;

determine the amount by which the laser turns for determining the points in the point cloud based on the syntax element, wherein the instructions that cause the one or more processors to determine the amount by which the laser turns comprise instructions that cause the one or more processors to one of:

determine a number of laser probes by the laser in one single rotation; or determine a change in an azimuth angle by which the laser turns; and reconstruct the point cloud based on the determined amount by which the laser turns.

* * * * *